(12) United States Patent
Mokheimer et al.

(10) Patent No.: US 10,189,709 B2
(45) Date of Patent: Jan. 29, 2019

(54) SYSTEM FOR COGENERATION OF POWER AND HYDROGEN

(71) Applicant: KING FAHD UNIVERSITY OF PETROLEUM AND MINERALS, Dhahran (SA)

(72) Inventors: Esmail Mohamed Ali Mokheimer, Dhahran (SA); Yinka Sofihullahi Sanusi, Dhahran (SA); Mohamed A. Habib, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 112 days.

(21) Appl. No.: 15/629,953

(22) Filed: Jun. 22, 2017

(65) Prior Publication Data

US 2018/0370796 A1 Dec. 27, 2018

(51) Int. Cl.
*C01B 3/38* (2006.01)

(52) U.S. Cl.
CPC .......... *C01B 3/382* (2013.01); *C01B 2203/00* (2013.01); *C01B 2203/02* (2013.01); *C01B 2203/0205* (2013.01)

(58) Field of Classification Search
CPC .......................................... C01B 3/501–3/505
See application file for complete search history.

(56) References Cited

U.S. PATENT DOCUMENTS

| 7,947,116 B2* | 5/2011 | Mundschau | B01D 53/226 |
| | | | 423/651 |
| 9,004,909 B2 | 4/2015 | Ghoniem et al. | |
| 9,562,472 B2 | 2/2017 | Kelly et al. | |
| 2003/0039608 A1* | 2/2003 | Shah | C01B 3/38 |
| | | | 423/650 |
| 2006/0115691 A1* | 6/2006 | Hilmen | B01D 53/22 |
| | | | 429/411 |
| 2007/0044479 A1 | 3/2007 | Brandt et al. | |
| 2014/0154634 A1 | 6/2014 | Niass et al. | |

OTHER PUBLICATIONS

J.W. Phair, et al., "Materials for separation membranes in hydrogen and oxygen production and future power generation", Science and Technology of Advanced Materials. vol. 7, No. 8, Dec. 29, 2006, pp. 792-805.

Giampaolo Manzolini, et al., "Co-production of hydrogen and electricity from autothermal reforming of natural gas by means of Pd-Ag membranes", Energy Procedia, vol. 1, Feb. 2009, pp. 319-326.

* cited by examiner

*Primary Examiner* — Matthew J Merkling
(74) *Attorney, Agent, or Firm* — Oblon, McClelland, Maier & Neustadt, L.L.P.

(57) ABSTRACT

A power generation system that includes a membrane reformer assembly, wherein syngas is formed from a steam reforming reaction of natural gas and steam, and wherein hydrogen is separated from the syngas via a hydrogen-permeable membrane, a combustor for an oxy-combustion of a fuel, an expander to generate power, and an ion transport membrane assembly, wherein oxygen is separated from an oxygen-containing stream to be combusted in the combustor. Various embodiments of the power generation system and a process for generating power using the same are provided.

19 Claims, 17 Drawing Sheets

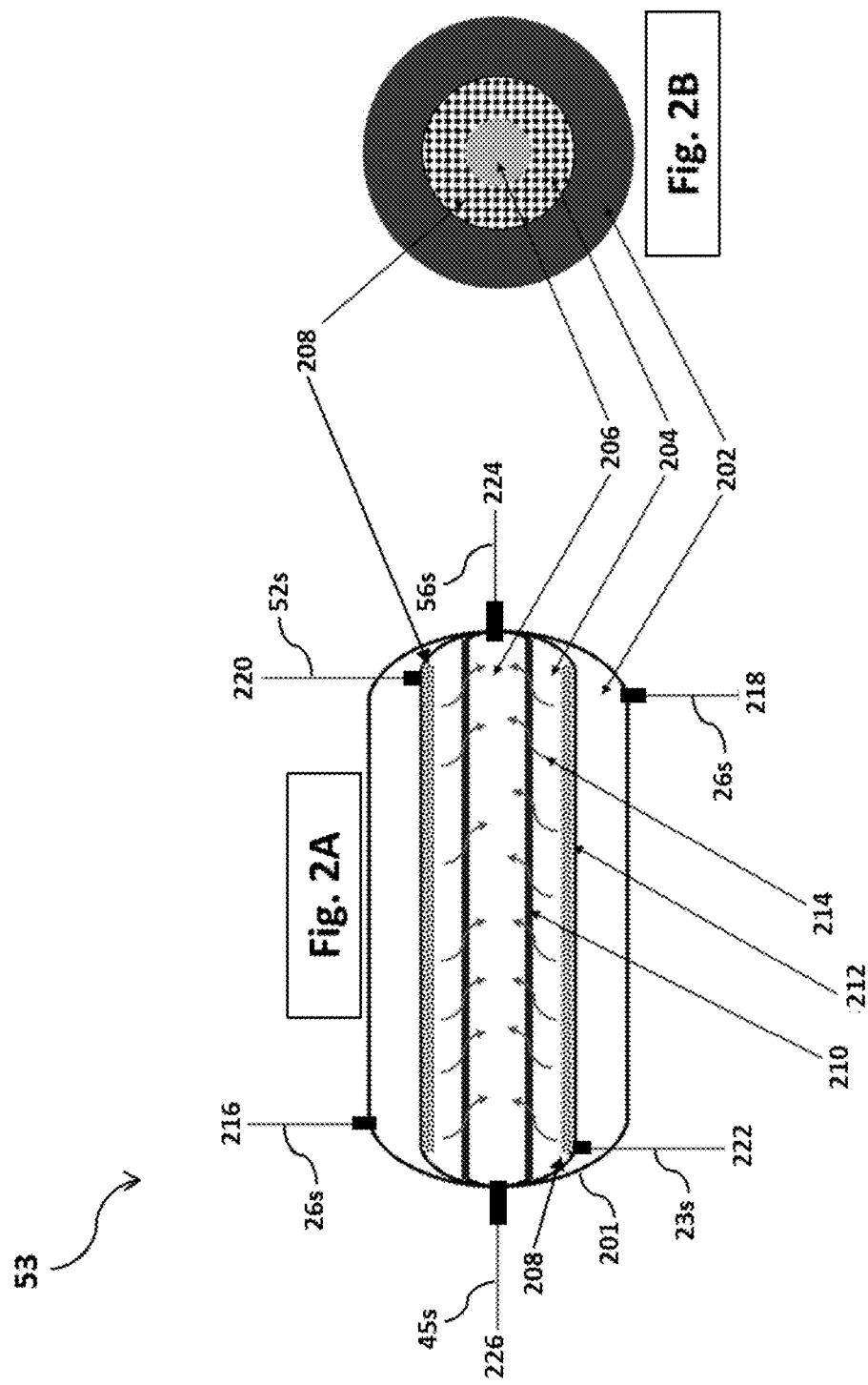

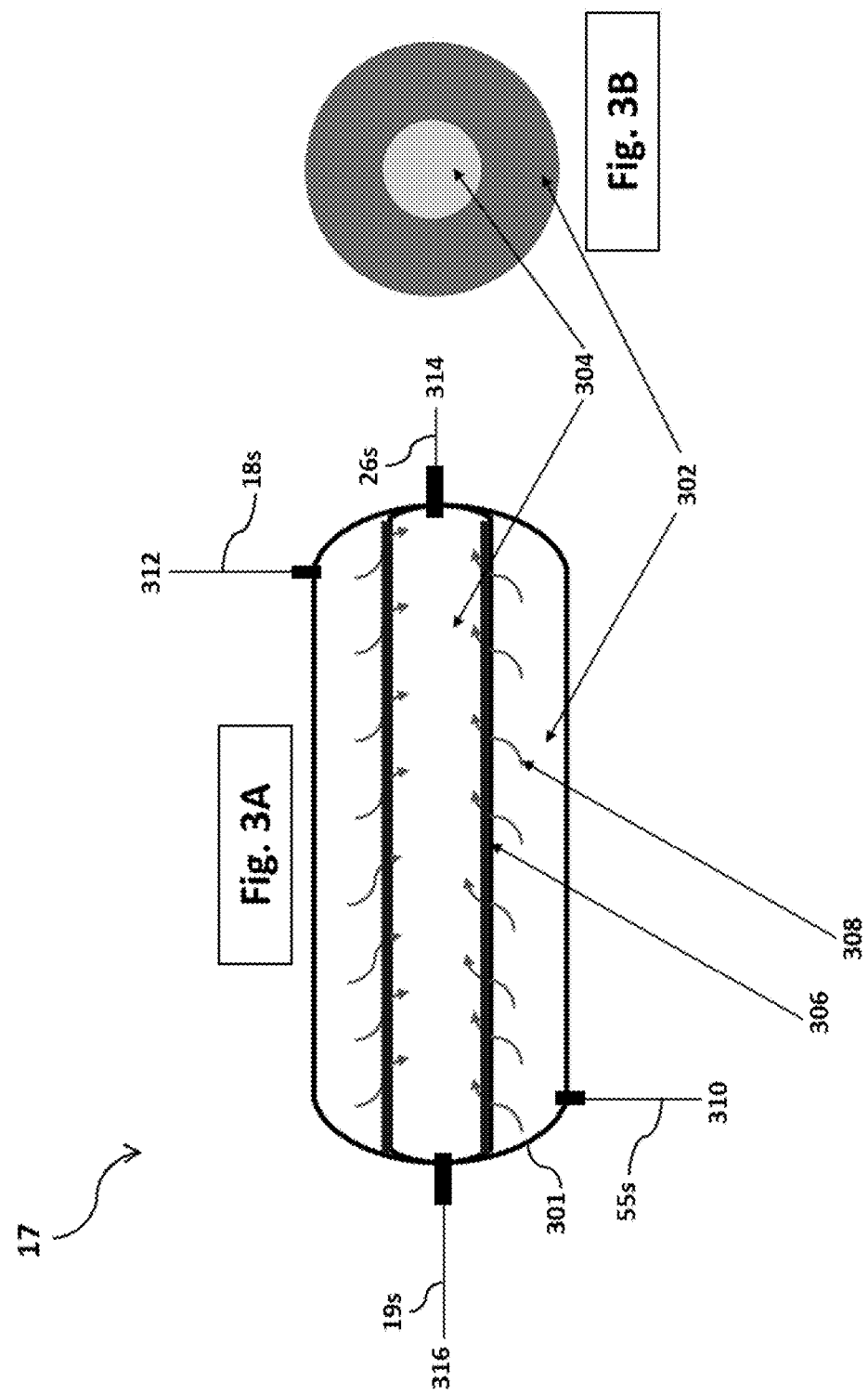

SYSTEM FOR COGENERATION OF POWER AND HYDROGEN

BACKGROUND OF THE INVENTION

Technical Field

The present invention relates to a power generation system that includes a membrane reformer assembly, a combustor, an expander, and an ion transport membrane assembly.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Most industrial hydrogen is produced via steam reforming natural gas. In a natural gas steam reforming plant, hydrocarbon and steam are catalytically reacted to produce syngas that mainly includes hydrogen and carbon monoxide. The hydrogen present in the syngas is further separated by pressure swing adsorption (PSA) techniques or hydrogen ($H_2$) selective membranes to produce streams of pure hydrogen and hydrogen depleted syngas. The steam reforming reaction of natural gas is endothermic and requires a high influx of heat energy to the reactor. A large amount of energy is needed for generating steam that supplies steam reforming reactors. This energy is mostly generated from fossil fuel resources that result in a large emission of greenhouse gas, particularly $CO_2$. Conservative regulations have recently been established to monitor $CO_2$ emission from fossil fuel plants. Therefore, plant designers have considered and applied different ways of carbon capture in the recent plant designs. They have also considered retrofitting conventional plants for carbon capture. These carbon capture techniques are pre-combustion, post-combustion, and oxy-combustion techniques. In oxy-combustion techniques, the fossil fuel is burned in the presence of pure oxygen (without nitrogen) with carbon dioxide (or exhaust gas, $CO_2$ and water vapor) as diluent. Therefore, the exhaust of an oxy-combustion contains only carbon dioxide ($CO_2$) and water vapor. Oxy-combustion is a promising technique because the produced carbon dioxide can further be captured by condensing water vapor in the exhaust. In addition, the condensed water vapor can be treated to produce distilled water or fresh water for drinking and industrial applications. In some recent designs, the oxygen required for the oxy-combustion is supplied from an air separation unit such as an ion transport membrane (ITM) assembly that separates oxygen from air or any other oxygen-containing gaseous mixture via transporting oxygen ions through an ion transport membrane at elevated temperatures.

In view of the forgoing, one objective of the present invention is to provide a power generation system that includes a membrane reformer assembly to form syngas and to separate hydrogen from the syngas, a combustor, an expander, and an ion transport membrane assembly. In the power generation system, the required energy for steam reforming reactions, hydrogen separation processes, steam generating processes, and oxygen separation processes are obtained by burning hydrogen-depleted syngas resulted from separation of hydrogen from syngas. Another objective of the present invention relates to a process for generating power using the power generation system.

BRIEF SUMMARY OF THE INVENTION

According to a first aspect, the present disclosure relates to a power generation system, including i) a membrane reformer assembly that includes a first vessel with a first internal cavity having a heating zone with a heating zone inlet and a heating zone outlet, a reaction zone with a reaction zone inlet and a reaction zone outlet, and a sweep zone with a sweep zone inlet and a sweep zone outlet, wherein the reaction zone and the sweep zone are separated by a hydrogen-permeable membrane, ii) a combustor that includes a) a plurality of combustor feed inlets, b) an exhaust outlet, wherein the combustor is located downstream of the membrane reformer assembly and at least one of said combustor feed inlets is fluidly connected to the reaction zone outlet via a syngas line, iii) an expander located downstream of the combustor and fluidly connected to the exhaust outlet via an exhaust line, wherein a natural gas/$H_2O$ stream is convened into a syngas stream in the reaction zone in the presence of a catalyst, and at least a portion of molecular hydrogen present in the syngas stream is transported across the hydrogen-permeable membrane to the sweep zone leaving behind a hydrogen-depleted syngas stream in the reaction zone, wherein the hydrogen-depleted syngas stream is combusted in the combustor to form an exhaust stream, and wherein the exhaust stream is expanded in the expander to generate power.

In one embodiment, the hydrogen-permeable membrane has a thickness in the range of 1 μm to 10 mm.

In one embodiment, the power generation system further includes an ion transport membrane assembly that includes a) a second vessel with a second internal cavity, b) an ion transport membrane that divides the second internal cavity into a feed zone and a permeate zone, wherein the feed zone has an ITM feed inlet and an ITM feed outlet and the permeate zone has a permeate zone inlet and a permeate zone outlet, wherein at least a portion of molecular oxygen present in an oxygen-containing stream that is delivered to the feed zone is transported across the ion transport membrane to the permeate zone, wherein the ion transport membrane assembly is located downstream of the membrane reformer assembly and the permeate zone inlet is fluidly connected to the heating zone outlet via a sweep gas line, and wherein the ion transport membrane assembly is located upstream of the combustor and the permeate zone outlet is fluidly connected to one of said combustor feed inlets via an oxygen line.

In one embodiment, the power generation system further includes a heat recovery steam generator located downstream of the expander and fluidly connected to the exhaust line via a second exhaust line, wherein the heat recovery steam generator generates steam by heat exchanging between a second water stream and the exhaust stream.

In one embodiment, the power generation system further includes an exhaust recycle line that fluidly connects the exhaust line to the heating zone inlet of the membrane reformer assembly.

In one embodiment, the power generation system further includes i) a high-pressure steam line fluidly connected to the heat recovery steam generator, ii) a gas mixer fluidly connected to a natural gas line and the high-pressure steam line, wherein the gas mixer mixes a natural gas stream with steam to form the natural gas/$H_2O$ stream, iii) a reformer fuel line that fluidly connects the gas mixer to the reaction zone inlet of the membrane reformer assembly, wherein the reformer fuel line delivers the natural gas/$H_2O$ stream to the reaction zone.

In one embodiment, the gas mixer operates in a pressure range of 2 to 20 bars, and the system further includes a first compressor fluidly connected to the natural gas line, wherein the first compressor pressurizes the natural gas stream to a pressure range of 2 to 20 bars.

In one embodiment, the power generation system further includes i) a second high-pressure steam line that fluidly connects the high-pressure steam line to the sweep zone inlet of the membrane reformer assembly, wherein the second high-pressure steam line delivers steam to the sweep zone to sweep the molecular hydrogen and to form a $H_2/H_2O$ stream, ii) a first condenser located downstream of the membrane reformer assembly and fluidly connected to the sweep zone outlet via a hydrogen line, wherein the first condenser condenses the $H_2/H_2O$ stream to form a hydrogen stream and a first purified water stream.

In one embodiment, the power generation system further includes i) an ITM compressor located upstream of the ion transport membrane assembly and fluidly connected to the ITM feed inlet via an ITM feed line, wherein the ITM compressor pressurizes the oxygen-containing stream, ii) a turbine located downstream of the ion transport membrane assembly and fluidly connected to the ITM feed outlet via an oxygen-depleted line, wherein the turbine expands an oxygen-depleted stream that egresses the feed zone to generate power.

In one embodiment, the ITM compressor is coupled to the turbine via a shaft.

In one embodiment, the heat recovery steam generator is solar-powered.

In one embodiment, the power generation system further includes a second condenser located downstream of and fluidly connected to the heat recovery steam generator via a third exhaust line, wherein the second condenser condenses the exhaust stream from the heat recovery steam generator to form a $CO_2$ stream and a second purified water stream.

In one embodiment, the power generation system further includes i) a $CO_2$ line fluidly connected to the second condenser, ii) a $CO_2$ recycle line that fluidly connects the $CO_2$ line to the oxygen line, wherein the $CO_2$ recycle line delivers at least a portion of the $CO_2$ stream to the oxygen line, iii) a second compressor fluidly connected to the $CO_2$ recycle line.

In one embodiment, the power generation system further includes a water treatment plant located downstream of and fluidly connected to the first condenser via a first purified water line and downstream of and fluidly connected to the second condenser via a second purified water line, wherein the water treatment plant produces distilled water.

According to a second aspect, the present disclosure relates to a process for generating power with the power generating system, involving i) mixing the natural gas stream with steam to form the natural gas/$H_2O$ stream and delivering the natural gas/$H_2O$ stream to the reaction zone of the membrane reformer assembly, wherein at least a portion of the natural gas/$H_2O$ stream is converted into the syngas stream in the presence of the catalyst, and wherein a portion of molecular hydrogen present in the syngas stream is transported across the hydrogen-permeable membrane to the sweep zone, ii) flowing steam to the sweep zone to sweep the molecular hydrogen and to form a $H_2/H_2O$ stream, iii) condensing the $H_2/H_2O$ stream to form a hydrogen stream and a first purified water stream, iv) combusting the hydrogen stream to generate power.

In one embodiment, the process further involves i) combusting the syngas stream and optionally a portion of the natural gas stream in the presence of an oxidant in the combustor to form the exhaust stream, ii) expanding the exhaust stream in the expander to generate power.

In one embodiment, the process further involves delivering at least a portion of the exhaust stream to the heating zone of the membrane reformer assembly to heat the reaction zone to a temperature in the range of 500 to 1,200° C.

In one embodiment, the oxidant comprises an oxygen-enriched stream and the process further involves i) delivering the oxygen-containing stream to the feed zone of the ion transport membrane assembly, wherein a portion of molecular oxygen present in the oxygen-containing stream is transported across the ion transport membrane to the permeate zone, ii) flowing a portion of the exhaust stream to the permeate zone to sweep the molecular oxygen and to form the oxygen-enriched stream, which comprises oxygen, $CO_2$, and water vapor, and is substantially free from nitrogen, iii) delivering the oxygen-enriched stream to the combustor.

In one embodiment, the process further involves condensing the exhaust stream to form a $CO_2$ stream and a second purified water stream.

In one embodiment, the process further involves delivering the first and the second purified water streams to a water treatment plant to produce distilled water.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A is an illustration of a membrane reformer assembly in the power generation system.

FIG. 2B is an illustration of a cross-section of the membrane reformer assembly.

FIG. 3A is an illustration of an ion transport membrane assembly in the power generation system.

FIG. 3B is an illustration of a cross-section of the ion transport membrane assembly.

DETAILED DESCRIPTION OF THE EMBODIMENTS

Figure 1A:
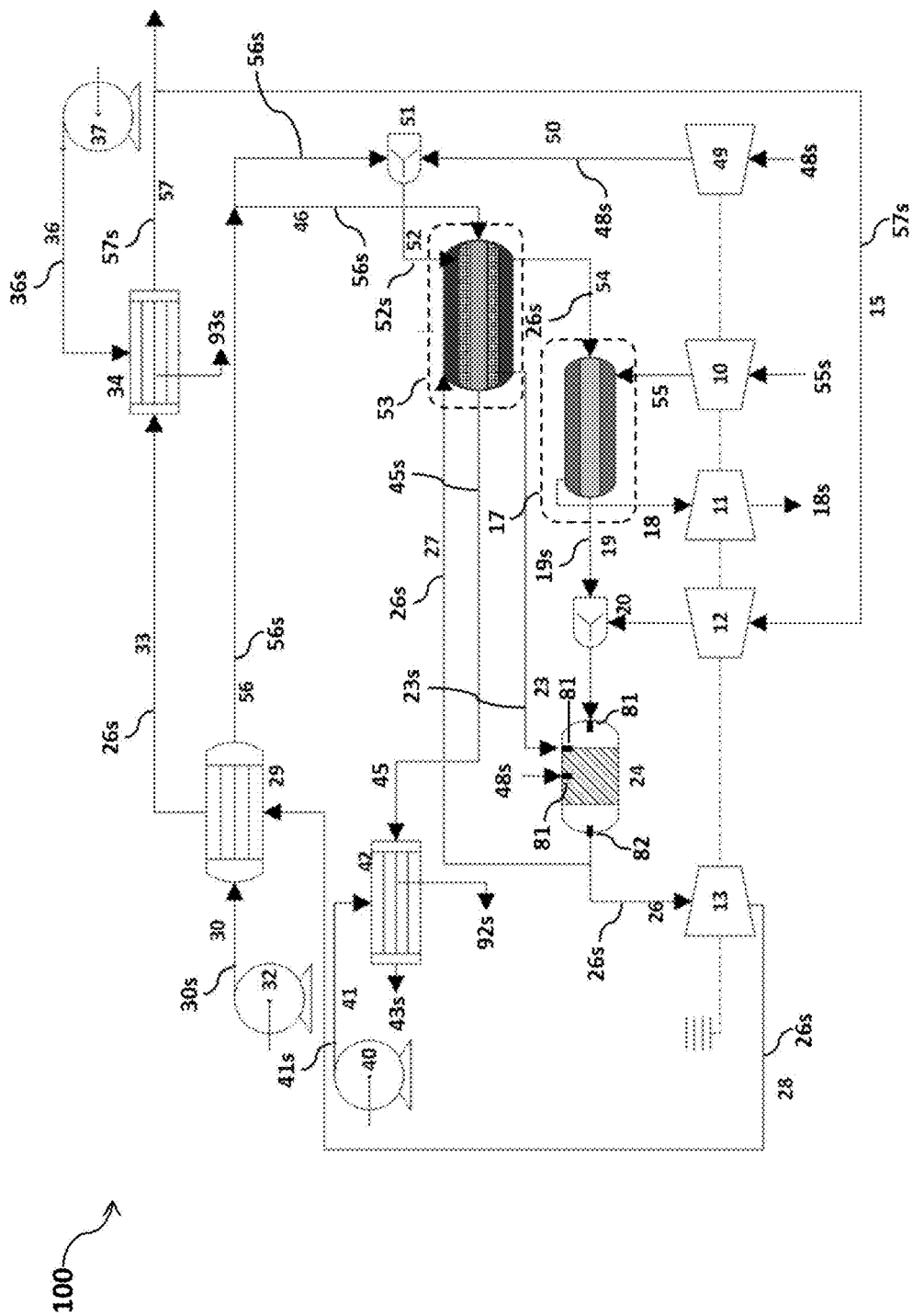
FIG. 1A is a process flow diagram (PFD) of a power generation system.

Referring now to the drawings, wherein like reference numerals designate identical or corresponding parts throughout the several views.

Referring to FIG. 1A, according to a first aspect, the present disclosure relates to a power generation system 100. The term "power generation system" as used herein refers to a system that generates power by combusting, i.e. oxy-combusting, syngas and/or hydrogen gas. In addition, the power generation system of this disclosure produces hydrogen and distilled water.

In one embodiment, the power generation includes a membrane reformer assembly 53, a combustor 24, and an expander 13.

Referring now to FIGS. 2A and 2B. The membrane reformer assembly as used herein refers to a unit in the system that produces syngas from a natural gas/$H_2O$ stream 52s in the presence of a catalyst 208 via a steam reforming reaction, and further separates molecular hydrogen 214 from the syngas via a hydrogen-permeable membrane 210. In one embodiment, steam reforming of the syngas and separation of molecular hydrogen 214 from the syngas is carried out in a single unit, i.e. the membrane reformer assembly 53. In view of that, the membrane reformer assembly 53 includes a first vessel 201 having a first internal cavity. The first internal cavity contains at least three separate zones, i.e. a heating zone 202, a reaction zone 204, and a sweep zone 206. Each of said zones may have at least one inlet and at least one outlet. Accordingly, in one embodiment, the heating zone 202 has a heating zone inlet 216 and a heating zone outlet 218, the reaction zone 204 has a reaction zone inlet 220 and a reaction zone outlet 222, and the sweep zone 206 has a sweep zone inlet 224 and a sweep zone outlet 226.

In one embodiment, the first vessel 201 is a sealed compartment that includes a plurality of sealed compartments, wherein each sealed compartment is configured to hold a gaseous mixture at elevated temperatures and pressures, for example, at a temperature in the range of 800-2,000° C., more preferably 1,000-1,800° C., even more preferably 1,200-1,500° C., and a pressure in the range of 1-50 bars, preferably 5-30 bars, more preferably 10-20 bars. In a preferred embodiment, the first vessel 201 is made of a high-temperature duty ceramic composite that can endure a temperature of up to 1,500° C., preferably up to 2,000° C., more preferably up to 2,500° C. Exemplary high-temperature duty ceramic composite may include, but not limited to, borides, carbides, nitrides, and oxides of transition metals selected from the group consisting of Al, Si, Sc, Ti, V, Cr, Zr, Nb, Mo, Hf, Ta, and Th, for example, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), tantalum carbide (TaC), and composites thereof. The first vessel may also be made of a metal alloy such as stainless steel, nickel steel, chromium steel, cemented carbide, titanium, and the like. In the embodiments where the first vessel is made of a metal alloy, an interior surface of the first vessel may be coated with an oxidation resistant layer to minimize internal surface oxidation. For example, the interior surface of the first vessel may be coated with the high-temperature duty ceramic composite, quartz, alumina, silicon nitride, silicon carbide, and the like. Although the materials used to construct the first vessel are not meant to be limiting and various other materials may also be used.

In some preferred embodiments, the first vessel 201 has a cylindrical geometry with a first and a second end separated by a side wall along a longitudinal axis of the first vessel, and the hydrogen-permeable membrane 210, and an impermeable divider 212 are cylindrical and are located inside the first vessel such that the first vessel 201, the impermeable divider 212, and the hydrogen-permeable membrane 210 are concentric cylinders, i.e. having the same cylindrical axis. Accordingly, each of the impermeable divider 212 and the hydrogen-permeable membrane 210 has a longitudinal axis which is substantially parallel to the longitudinal axis of the first vessel 201. Preferably, an internal volume of the first vessel is in the range of 0.01-50 $m^3$, or preferably 0.1-20 $m^3$, or preferably 0.5-10 $m^3$, or preferably 1-5 $m^3$. In view of that, an aspect ratio of the first vessel (i.e. a ratio of a length of the first vessel to a diameter of the first vessel) is in the range of 50:1 to 1:1, preferably 40:1 to 5:1, preferably 30:1 to 10:1. Preferably, the first vessel is horizontally oriented, i.e. the longitudinal axis of the first vessel is parallel to a ground surface, although the first vessel may also be vertically oriented. The first vessel 201 may have other geometries such as rectangular, spherical, oblong, conical, and pyramidal.

Accordingly, the reaction zone 204 and the sweep zone 206 of the membrane reformer assembly 53 are separated by the hydrogen-permeable membrane 210. In some embodiments, the hydrogen-permeable membrane 210 is an elongated tube having a diameter in the range of 5 to 500 mm, preferably 10 to 100 mm, more preferably 15 to 50 mm. Furthermore, the elongated tube preferably has a length equal to the length of the first vessel. A wall thickness of the hydrogen-permeable membrane may be in the range of 1 μm to 10 mm, preferably 20 μm to 1 mm, preferably 40 to 500 μm, preferably 50 to 200 μm, preferably 60 to 100 μm. Additionally, a surface area of the hydrogen-permeable membrane may be in the range of 0.05 $m^2$-5 $m^2$, preferably 0.1-4 $m^2$, more preferably 0.5-3 $m^2$, even more preferably 1-2 $m^2$. Accordingly, a hydrogen flux of the hydrogen-permeable membrane may be within the range of 0.01-0.2 mol·m$^{-2}$·s$^{-1}$, preferably 0.05-0.15 mol·m$^{-2}$·s$^{-1}$, more preferably 0.08-0.12 mol·m$^{-2}$·s$^{-1}$, at a temperature in the range of 800-2,000° C., more preferably 1,000-1,800° C., even more preferably 1,200-1,500° C.

The hydrogen-permeable membrane that is used in the membrane reformer assembly functions to separate hydrogen from a hydrogen-enriched stream, e.g. the syngas, by transporting molecular hydrogen 214 through the hydrogen-permeable membrane 210 at elevated temperatures, e.g. a temperature in the range of 300 to 900° C., preferably 500 to 800° C. When a hydrogen-enriched stream, e.g. syngas, is applied on one side of a hydrogen-permeable membrane under pressure, hydrogen molecules transport through the membrane and emerge on an opposite side of the membrane. Accordingly, the hydrogen-permeable membrane 210 may only allow passage of hydrogen molecules from the reaction zone 204 to the sweep zone 206.

The reaction zone 204 refers to a space inside the first vessel 201, wherein syngas is formed from a gaseous mixture of natural gas and steam via a steam reforming reaction, in the presence of a catalyst 208. The catalyst 208 is well known to the skilled in the art. In one embodiment, the catalyst 208 is a nickel-doped aluminum oxide having 15 to 30 wt %, preferably 20 to 28 wt % of nickel, relative to the total weight of the catalyst 208. The steam reforming reaction of natural gas and steam to form syngas is as follows:

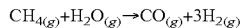

$$CH_{4(g)} + H_2O_{(g)} \rightarrow CO_{(g)} + 3H_{2(g)}$$

The reaction zone 204 may have a temperature in the range of 600 to 1,100° C., preferably 700 to 1,000° C., preferably 800 to 900° C.

The sweep zone 206 of the membrane reformer assembly 53 refers to a space inside the first vessel 201, wherein molecular hydrogen 214 is collected. When a hydrogen molecule present in the reaction zone, i.e. after formation of the syngas, is contacted with the hydrogen-permeable membrane 210, the hydrogen molecule may be transported through the hydrogen-permeable membrane 210 and into the sweep zone.

In a preferred embodiment, the hydrogen-permeable membrane 210 is a palladium based alloy known to the skilled in the art. Alternatively, in another embodiment, the hydrogen-permeable membrane 210 is a palladium-silver alloy membrane, wherein an amount of silver in the hydrogen-permeable membrane is in the range of 15 wt % to 30 wt %, preferably 20 wt % to 28 wt %, preferably about 25 wt %, relative to the total weight of the hydrogen-permeable membrane. In addition, one or more transition metals may also be incorporated in the composition of the hydrogen-permeable membrane. Said transition metals may preferably be selected from the group consisting of yttrium, indium, copper, and ruthenium.

In one embodiment, a hydrogen separation capacity of the hydrogen-permeable membrane 210 is in the range of 0.1 to 10 m$^3$/h (cubic meter per hour), preferably 0.5 to 9.0 m$^3$/h, preferably 1.0 to 8.0 m$^3$/h, preferably 1.5 to 7.5 m$^3$/h, preferably 2.0 to 7.0 m$^3$/h, preferably 2.5 to 6.0 m$^3$/h.

In one embodiment, a selectivity of the hydrogen-permeable membrane 210 with respect molecular hydrogen is at least 90 wt %, preferably at least 95 wt %, more preferably at least 98 wt %, relative to the total weight of the substances that are adsorbed and transported by the membrane. Selectivity of a hydrogen-permeable membrane with respect to a particular substance is a measure of the capability of that hydrogen-permeable membrane to adsorb and transport that substance over other substances present. For example, if selectivity of a hydrogen-permeable membrane with respect to molecular hydrogen is 99 wt %, then 99 wt % of the total substances that are transported by the membrane are hydrogen molecules. Similarly, a hydrogen-permeable membrane having 100 wt % selectivity with respect to molecular hydrogen 214 only allows hydrogen molecules to permeate through the membrane. In another embodiment, a selectivity of the hydrogen-permeable membrane with respect to carbon monoxide, methane, nitrogen (i.e. N$_2$), water vapor, carbon monoxide, argon, and sulfur is less than 1 wt %, preferably less than 0.5 wt %, more preferably less than 0.1 wt %.

The reaction zone inlet 220 and the reaction zone outlet 222 are utilized as passages for loading and unloading the reaction zone 204 of the membrane reformer assembly 53. In one embodiment, the reaction zone inlet 220 and the reaction zone outlet 222 are substantially the same, wherein each is a cylindrical port having an internal diameter in the range of 10-80 mm, preferably 15-60 mm, preferably 20-50 mm, preferably 25-40 mm, for delivering a pressurized stream having a pressure in the range of 1-50 bars, preferably 5-30 bars, more preferably 10-20 bars, in and out of the reaction zone 204. The reaction zone inlet 220 and the reaction zone outlet 222 may be secured perpendicular or parallel to the longitudinal axis of the first vessel. In a preferred embodiment, the first vessel 201 is a horizontally oriented cylindrical vessel, where the reaction zone inlet 220 and the reaction zone outlet 222 are secured perpendicular to the longitudinal axis of the first vessel 201 (as depicted in FIG. 2A). Alternatively, the reaction zone inlet 220 and the reaction zone outlet 222 may be disposed parallel to the longitudinal axis of the first vessel.

Similarly, the sweep zone inlet 224 and the sweep zone outlet 226 are utilized as passages for loading and unloading the sweep zone 206. In one embodiment, the sweep zone inlet 224 and the sweep zone outlet 226 are substantially the same, wherein each is a cylindrical port having an internal diameter in the range of 10-80 mm, preferably 15-60 mm, preferably 20-50 mm, preferably 25-40 mm, for delivering a pressurized stream having a pressure in the range of 1-50 bars, preferably 5-30 bars, more preferably 10-20 bars, in and out of the sweep zone 206. Preferably, the sweep zone inlet 224 and the sweep zone outlet 226 are secured parallel to the longitudinal axis of the first vessel 201, as shown in FIG. 2A.

Similarly, the heating zone inlet 216 and the heating zone outlet 218 are utilized as passages for loading and unloading the heating zone 202. In one embodiment, the heating zone inlet 216 and the heating zone outlet 218 are substantially the same, wherein each is a cylindrical port having an internal diameter in the range of 10-80 mm, preferably 15-60 mm, preferably 20-50 mm, preferably 25-40 mm, for delivering a pressurized stream having a pressure in the range of 1-50 bars, preferably 5-30 bars, more preferably 10-20 bars, in and out of the heating zone 202. Preferably, the heating zone inlet 216 and the heating zone outlet 218 are secured perpendicular to the longitudinal axis of the first vessel 201, as shown in FIG. 2A.

Other than the aforementioned inlets/outlets designed to allow ingress and egress of a gaseous stream, the first vessel may be sealed to prevent any leakage.

In a preferred embodiment, the first vessel 201 is a horizontally oriented cylindrical vessel with a first end and a second end, wherein the reaction zone inlet 220, the sweep zone inlet 224, and the heating zone outlet 218 are located on the first end and the reaction zone outlet 222, the sweep zone outlet 226, and the heating zone inlet 216 are located on the second end, as shown in FIG. 2A. Although this configuration of inlets and outlets is not meant to be limiting and other configuration may also utilized.

The heating zone 202 and the reaction zone are separated by an impermeable divider 212. The impermeable divider 212 is made of a material with a high thermal conductivity to effectively transfer heat from the heating zone 202 to the reaction zone 204 to raise a temperature of the reaction zone. Further, the impermeable divider 212 has a high thermal stability to withstand an aggressive thermal condition of the membrane reformer assembly 53. Accordingly, the impermeable divider 212 may be made of at least one ceramic material selected from the group consisting of aluminum nitride, silicon carbide, alumina silicon nitride, and zirconium oxide. In addition, metal particles/nanoparticles may be incorporated into the ceramic materials to increase thermal conductivity of the impermeable divider 212. The metal particles/nanoparticles may be selected from the group consisting of aluminum, iron, copper, lead, nickel, tin, tungsten, silver, and gold.

When a natural gas/$H_2O$ stream 52s is delivered to the reaction zone, methane and water vapor present in the natural gas/$H_2O$ stream 52s is converted into syngas in the presence of a catalyst 208 via the steam reforming reaction. Furthermore, at least a portion of molecular hydrogen 214 present in the syngas is transported across the hydrogen-permeable membrane 210 to the sweep zone 206, leaving behind a hydrogen-depleted syngas stream 23s in the reaction zone.

Referring now to FIG. 1A. The combustor 24 as used herein refers to a sealed vessel those combusts combustible compounds via an oxy-combustion. Accordingly, the hydrogen-depleted syngas stream 23s and optionally a natural gas stream 48s are combusted in the presence of an oxidant to form a gaseous mixture having an elevated pressure and temperature. The combustor 24 includes a plurality of combustor feed inlets 81 and an exhaust outlet 82.

In some preferred embodiments, the combustor 24 includes an oxygen inlet, a fuel inlet, a syngas inlet, and an exhaust outlet 82. Preferably, the oxygen inlet, the fuel inlet, the syngas inlet, and the exhaust outlet 82 are substantially similar, wherein each is a tubular channel that is configured to deliver a gaseous stream to the combustor or from the combustor. Preferably, the oxygen inlet, the fuel inlet, the syngas inlet, and the exhaust outlet 82 are made of a metal, a metal alloy, a ceramic composite, or a metal alloy coated with a high-temperature duty ceramic (e.g. alumina). Preferably, the oxygen inlet, the fuel inlet, the syngas inlet, and the exhaust outlet 82 may bear a pressure of up to 50 bars, preferably up to 100 bars, even more preferably up to 150 bars, while may also endure a temperature up to 1,000° C., preferably 1,500° C., more preferably 2,000° C.

The combustor 24 is located downstream of the membrane reformer assembly 53 and at least one of said combustor feed inlets, e.g. the syngas inlet, is fluidly connected to the reaction zone outlet 222 via a syngas line 23. The hydrogen-depleted syngas stream 23s present in the reaction zone is further combusted in the combustor 24 to form an exhaust stream 26s.

The expander 13 is located downstream of the combustor 24 and fluidly connected to the exhaust outlet 82 via a syngas line 23. The expander as used herein may preferably be a centrifugal or an axial flow turbine, wherein the exhaust stream 26s is expanded in an isentropic process (i.e. a constant entropy process) to produce shaft work when the exhaust stream 26s passes through vanes of said turbine. The shaft work may further be utilized to drive a compressor, a generator (for generating electricity), a crankshaft of an engine, etc. In a preferred embodiment, at least a portion of the shaft work is utilized to operate the compressor of the power generation system 100, i.e. the first compressor 49, the second compressor 12, and the ITM compressor 10.

In one embodiment, the power generation system 100 further includes an ion transport membrane (ITM) assembly 17, which is located downstream of the membrane reformer assembly 53 such that the permeate zone inlet 314 is fluidly connected to the heating zone outlet 218 via a sweep gas line 54 (as seen in FIGS. 1A-1D). Additionally, the ion transport membrane assembly is located upstream of the combustor 24 such that the permeate zone outlet 316 is fluidly connected to one of said combustor feed inlets 81 of the combustor 24 via an oxygen line 19 (as seen in FIG. 1A).

Referring now to FIGS. 3A and 3B. The term "ion transport membrane assembly" as used herein refers to a unit in the power generation system that separates molecular oxygen 308 from an oxygen-containing stream 55s, e.g. an air stream. The ion transport membrane assembly includes a second vessel 301 with a second internal cavity that contains a feed zone 302 and a permeate zone 304 that are separated by an ion transport membrane (ITM) 306. Each of the feed and the permeate zones have at least one inlet and one outlet. In one embodiment, the feed zone 302 has an ITM feed inlet 310 and an ITM feed outlet 312, and the permeate zone 304 has a permeate zone inlet 314 and a permeate zone outlet 316.

In one embodiment, the second vessel 301 is a sealed compartment configured to hold a gaseous mixture at elevated temperatures and pressures, for example, at a temperature in the range of 800-2,000° C., more preferably 1,000-1,800° C., even more preferably 1,200-1,500° C., and a pressure in the range of 1-50 bars, preferably 5-30 bars, more preferably 10-20 bars.

The second vessel 301 may be made of a high-temperature duty ceramic composite that can endure a temperature of up to 1,500° C., preferably up to 2,000° C., more preferably up to 2,500° C. Exemplary high-temperature duty ceramic composite may include, but not limited to, borides, carbides, nitrides, and oxides of transition metals selected from the group consisting of Al, Si, Sc, Ti, V, Cr, Zr, Nb, Mo, Hf, Ta, and Th, for example, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), tantalum carbide (TaC), and composites thereof. In another preferred embodiment, the second vessel is made of a metal alloy such as stainless steel, nickel steel, chromium steel, and an interior surface of the second vessel may be coated with an oxidation resistant layer to minimize internal surface oxidation. For example, the interior surface of the second vessel may be coated with the high-temperature duty ceramic composite, quartz, alumina, Pyrex®, and the like. Although the materials used to construct the second vessel are not meant to be limiting and various other materials may also be used.

In some preferred embodiments, the second vessel 301 may have a cylindrical geometry with a first and a second end separated by a side wall along a longitudinal axis of the second vessel, and the ion transport membrane has a longitudinal axis which is substantially parallel to the longitudinal axis of the second vessel. Preferably, an internal volume of the second vessel is in the range of 0.01-50 $m^3$, or preferably 0.1-20 $m^3$, or preferably 0.5-10 $m^3$, or preferably 1-5 $m^3$. In view of that, an aspect ratio of the second vessel (i.e. a ratio of a length of the second vessel to a diameter of the second vessel) is in the range of 50:1 to 1:1, preferably 40:1 to 5:1, preferably 30:1 to 10:1. Preferably, the second vessel is horizontally oriented, i.e. the longitudinal axis of the second vessel is parallel to a ground surface, although the second vessel 301 may also be vertically oriented. The second vessel may have other geometries such as rectangular, spherical, oblong, conical, and pyramidal.

In some embodiments, the ion transport membrane (ITM) 306 is an elongated tube having a diameter in the range of 5 to 500 mm, preferably 10 to 100 mm, more preferably 15 to 50 mm. Furthermore, the elongated tube preferably has a length equal to the length of the second vessel, for example, in the range of 0.5 to 5 m, more preferably 1 to 4 m, even more preferably 1.5 to 3 m. A wall thickness of the elongated tube may be in the range of 0.5 to 3.5 mm, preferably 0.5 to 2 mm, more preferably 1 to 1.5 mm. Additionally, a surface area of the ITM may be in the range of 0.05 m$^2$-5 m$^2$, preferably 0.1-4 m$^2$, more preferably 0.5-3 m$^2$, even more preferably 1-2 m$^2$. Accordingly, an oxygen flux of the ion transport membrane may be within the range of 0.01-0.2 mol·m$^{-2}$·s$^{-1}$, preferably 0.05-0.15 mol·m$^{-2}$·s$^{-1}$, more preferably 0.08-0.12 mol·m$^{-2}$·s$^{-1}$, at a temperature in the range of 800-2,000° C., more preferably 1,000-1,800° C., even more preferably 1,200-1,500° C.

In a preferred embodiment, the ITM 306 has a compressive strength of at least 50 MPa, preferably at least 100 MPa, more preferably at least 200 MPa, to sustain an excessive pressure in the feed zone. The ITM may preferably be secured inside the ITM assembly 17 with bolts and nuts, O-rings (e.g. ceramic or metal rings), and/or gaskets to prevent any leakage from the feed zone 302 to the permeate zone 304 and vice versa.

The ion transport membrane (ITM) 306 functions to separate oxygen from air or other oxygen-containing gaseous mixtures by transporting oxide ions (i.e. O$^{2-}$) through a membrane that is capable of conducting oxide ions and electrons at elevated temperatures. When an oxygen partial pressure differential is applied on opposite sides of such a membrane, oxygen molecules ionize on one surface of the membrane and emerge on an opposite side as oxide ions. Then, the oxide ions (i.e. O$^{2-}$) recombine into molecular oxygen 308 (i.e. O$_2$) on the opposite side (i.e. the side of the permeate zone), leaving behind free electrons that transport back through the membrane to ionize another oxygen molecule present on the feed zone side. Accordingly, the ITM may allow passage of oxide ions (i.e. O$^{2-}$), and thus O$_2$, from the feed zone to the permeate zone.

In view of that, the feed zone 302 of the ITM assembly 17 refers to a space inside the second vessel 301, wherein an oxygen-containing stream 55s is passed therethrough. Similarly, the permeate zone 304 of the ITM assembly 17 refers to a space inside the second vessel 301, wherein molecular oxygen 308 is collected. When an oxygen molecule present in the feed zone 302 contacts the ITM 306, the oxygen molecule may be reduced and an oxide ion (i.e. O$^{2-}$) may be formed. The oxide ions may transport through the ITM and may further be combined with another oxide ion to form molecular oxygen 308 (i.e. O$_2$) in the permeate zone 304.

The ITM 306 may have a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, Ti, Nb, Mn, and Ga. Further, each of x, x', y, and y' in the general formula of the ITM has a value between 0 and 1, such that x+x'=1 and y+y'=1. Also, z is a number that varies to maintain electro-neutrality of the ITM. For example, in some embodiments, the ITM is a perovskite-type ceramic having a composition of $Ba_uBi_wCo_xFe_yO_{3-\delta}$, $Ba_uCo_wFe_xNb_yO_{3-\delta}$, $Ba_uFe_xNb_yO_{3-\delta}$, $Ba_wCe_xFe_yO_{3-\delta}$, $Ba_uSr_wCo_xFe_yO_{3-\delta}$, $Ba_uTi_wCo_xFe_yO_{3-\delta}$, $Ca_uLa_wFe_xCo_yO_{3-\delta}$, $Sr_uCa_wMn_xFe_yO_{3-\delta}$, $Sr_uCo_wFe_yO_{3-\delta}$, $La_2NiO_{4+\delta}$, $La_uCa_xFe_yO_{3-\delta}$, $La_wCa_xCo_yO_{3-\delta}$, $La_uCa_wFe_xCo_yO_{3-\delta}$, $La_wSr_xCo_yO_{3-\delta}$, $La_uSr_wTi_xFe_yO_{3-\delta}$, $La_uSr_wCo_xFe_yO_{3-\delta}$, $La_uSr_wGa_xFe_yO_{3-\delta}$, or $12.8La_uSr_wGa_xFe_yO_{3-\delta}$—$Ba_uSr_vFe_{w-}Co_xFe_yO_{3-\delta}$, wherein u, v, w, x, and y are each in the range of 0-1, and δ varies to maintain electro-neutrality. In another embodiment, the ITM is a perovskite-type ceramic having a composition of $La_{1-x}Sr_xCoO_{3-\delta}$ with x in the range of 0.1-0.7. The ITM may be doped with a metallic element selected from the group consisting of Ni, Co, Ti, Zr, and La, or a metallic element selected from the lanthanide group of the periodic table (i.e. metallic chemical elements with atomic numbers 57 through 71). Furthermore, the ITM may include a coating layer having a composition of $RBaCO_2O_{5+\delta}$, wherein R is a metallic element selected from the lanthanide group (i.e. elements with atomic numbers 57 through 71) of the periodic table. Preferably, R is at least one element selected from the group consisting of Pr, Nd, Sm, and Gd. In a preferred embodiment, the ITM includes pores in the size range of 0.1-10 nm, preferably 0.5-5 nm, more preferably 0.5-3 nm.

In a preferred embodiment, the ITM 306 is a BSCF membrane material (i.e. $Ba_{0.5}Sr_{0.5}Co_{0.8}Fe_{0.2}O_{3-\delta}$ membrane) as provided by Mezghani et al. [Mezghani, K., et al., Effect of microstructure and thickness on oxygen permeation of $La_2NiO_{4+\delta}$ membranes, Ceramics International, 2016, 42(1); incorporated by reference in its entirety.]

In one embodiment, a selectivity of the ITM 306 with respect to oxide ions (i.e. O$^{2-}$) is at least 90%, preferably at least 95 wt %, more preferably at least 98 wt %. Selectivity of an ITM with respect to an ion (e.g. oxide ions) is a measure of the capability of that ITM to transport the ion (e.g. oxide ions), relative to the total ionized substances (by weight) on a surface of the ITM. Selectivity of an ITM with respect to oxide ions may be determined by the size of vacancies present in the crystal structure of the ITM. For example, if selectivity of an ITM with respect to oxide ions is 99 wt %, then 99 wt % of transported substances through the membrane are oxide ions, relative to the total ionized substances (by weight) on the surface of the ITM. Oxide ions form in a reduction reaction when molecular oxygen 308 is contacted with an ITM in the feed zone 302 and in the presence of free electrons. An ITM having 100 wt % selectivity with respect to oxide ions only allows the oxide ions to permeate through the membrane. In one embodiment, a selectivity of the ITM with respect to carbon dioxide, elemental nitrogen (i.e. N$_2$), water vapor, carbon monoxide, argon, and sulfur is less than 5 wt %, preferably less than 2 wt %, more preferably less than 1 wt %, even more preferably less than 0.5 wt %, relative to the total ionized substances (by weight) on the surface of the ITM.

The ITM feed inlet 310 and the ITM feed outlet 312 are utilized as passages for loading and unloading the feed zone 302. In one embodiment, the ITM feed inlet 310 and the ITM feed outlet 312 are substantially the same, wherein each is a cylindrical port having an internal diameter in the range of 10-80 mm, preferably 15-60 mm, preferably 20-50 mm, preferably 25-40 mm, for delivering a pressurized stream having a pressure in the range of 1-50 bars, preferably 5-30 bars, more preferably 10-20 bars, in and out of the feed zone 302 of the ITM assembly 17. The ITM feed inlet 310 and the ITM feed outlet 312 may be secured perpendicular or parallel to the longitudinal axis of the second vessel. In a preferred embodiment, the second vessel is a horizontally oriented cylindrical vessel, where the ITM feed inlet 310 and the ITM feed outlet 312 are secured perpendicular to the longitudinal axis of the second vessel 301 (as depicted in FIG. 3A). Alternatively, the ITM feed inlet 310 and the ITM feed outlet 312 may be disposed parallel to the longitudinal axis of the second vessel 301.

Similarly, the permeate zone inlet 314 and the permeate zone outlet 316 are utilized as passages for loading and unloading the permeate zone 304. In one embodiment, the permeate zone inlet 314 and the permeate zone outlet 316 are substantially the same, wherein each is a cylindrical port having an internal diameter in the range of 10-80 mm, preferably 15-60 mm, preferably 20-50 mm, preferably 25-40 mm, for delivering a pressurized stream having a pressure in the range of 1-50 bars, preferably 5-30 bars, more preferably 10-20 bars, in and out of the permeate zone 304. Preferably, the permeate zone inlet 314 and the permeate zone outlet 316 are secured parallel to the longitudinal axis of the second vessel 301, as shown in FIG. 3A.

Other than inlets/outlets designed to allow ingress and egress, the second vessel may be sealed to prevent any leakage.

In one embodiment, the second vessel 301 is a horizontally oriented cylindrical vessel with a first end and a second end, wherein the ITM feed inlet 310 and the permeate zone inlet 314 are located on the first end and the ITM feed outlet 312 and the permeate zone outlet 316 are located on the second end. Accordingly, the stream that flows inside the feed zone 302 has a co-current direction relative to the stream that flows inside the permeate zone 304. However, in a preferred embodiment, the ITM feed inlet 310 and the permeate zone outlet 316 are located on the first end and the ITM feed outlet 312 and the permeate zone inlet 314 are located on the second end. Accordingly, the stream that flows inside the feed zone 302 has a counter-current direction relative to the stream that flows inside the permeate zone 304.

Referring now to FIG. 1A, in one embodiment, an ITM compressor 10 is located upstream of the ITM assembly 17 and fluidly connected to the ITM feed inlet 310 via an ITM feed line 55. The ITM compressor 10 pressurizes an oxygen-containing stream 55$s$, e.g. an air stream, and further delivers the oxygen-containing stream 55$s$ to the feed zone 302 of the ITM assembly 17. When the oxygen-containing stream 55$s$ is delivered to the feed zone 302 and contacted with the ion transport membrane, at least a portion of molecular oxygen 308 present in the oxygen-containing stream 55$s$ is transported across the ion transport membrane to the permeate zone 304 leaving behind an oxygen-depleted stream 18$s$ in the feed zone 302. Alternatively, in another embodiment, an oxygen supplier may be utilized to deliver the oxygen-containing stream 55$s$ to the feed zone 302 of the ITM assembly 17. The oxygen supplier may be an air cylinder that contains pressurized air with a pressure in the range of 5-50 bars, preferably 10-40 bars, more preferably 15-30 bars. Further, the oxygen supplier may be an oxygen cylinder that contains pressurized oxygen with a pressure in the range of 5-50 bars, preferably 10-40 bars, more preferably 15-30 bars.

Additionally, a turbine 11 is located downstream of the ion transport membrane assembly and fluidly connected to the ITM feed outlet 312 via an oxygen-depleted line 18. The turbine 11 expands the oxygen-depleted stream 18$s$ that egresses the feed zone 302 to generate power. The ITM compressor 10 may preferably be coupled to the turbine via a shaft. Coupling the turbine 11 to the ITM compressor 10 may recover at least a portion of power consumed to operate the ITM compressor 10.

In addition, a heat exchanger may be located upstream of the ITM feed inlet 310 and downstream of the ITM feed outlet 312 or downstream of the turbine to raise the temperature of the oxygen-containing stream 55$s$ by heat exchanging with the oxygen-depleted stream 18$s$. Preferably, the heat exchanger may be utilized as an economizer to preheat the oxygen-containing stream 55$s$. Alternatively, the heat exchanger may be utilized to raise the temperature of the oxygen-containing stream 55$s$ to a range of 800-1,500° C., more preferably 1,000-1,400° C., even more preferably 1,200-1,300° C., before entering to the feed zone 302.

In one embodiment, an exhaust recycle line 27 fluidly connects the exhaust line 26 to the heating zone inlet 216 of the membrane reformer assembly 53. The exhaust recycle line 27 delivers at least a portion of the exhaust stream 26$s$ to the heating zone to recover at least a portion of the thermal energy of the exhaust stream 26$s$ to heat the reaction zone of the membrane reformer assembly 53.

In a preferred embodiment, the power generation system 100 further includes a heat recovery steam generator (HRSG) 29 located downstream of the expander 13 and fluidly connected to the exhaust line 26 via a second exhaust line 28. The heat recovery steam generator generates steam using thermal energy of the exhaust stream 26$s$, for example, by heat exchanging between a second water stream 30$s$ and the exhaust stream 26$s$. The steam 56$s$ may further be delivered to one or more downstream facilities. The second water stream 30$s$ may be delivered to the HRSG 29 by a second pump 32 and a second water line 30. The heat recovery steam generator may be solar-powered.

Figure 1B:
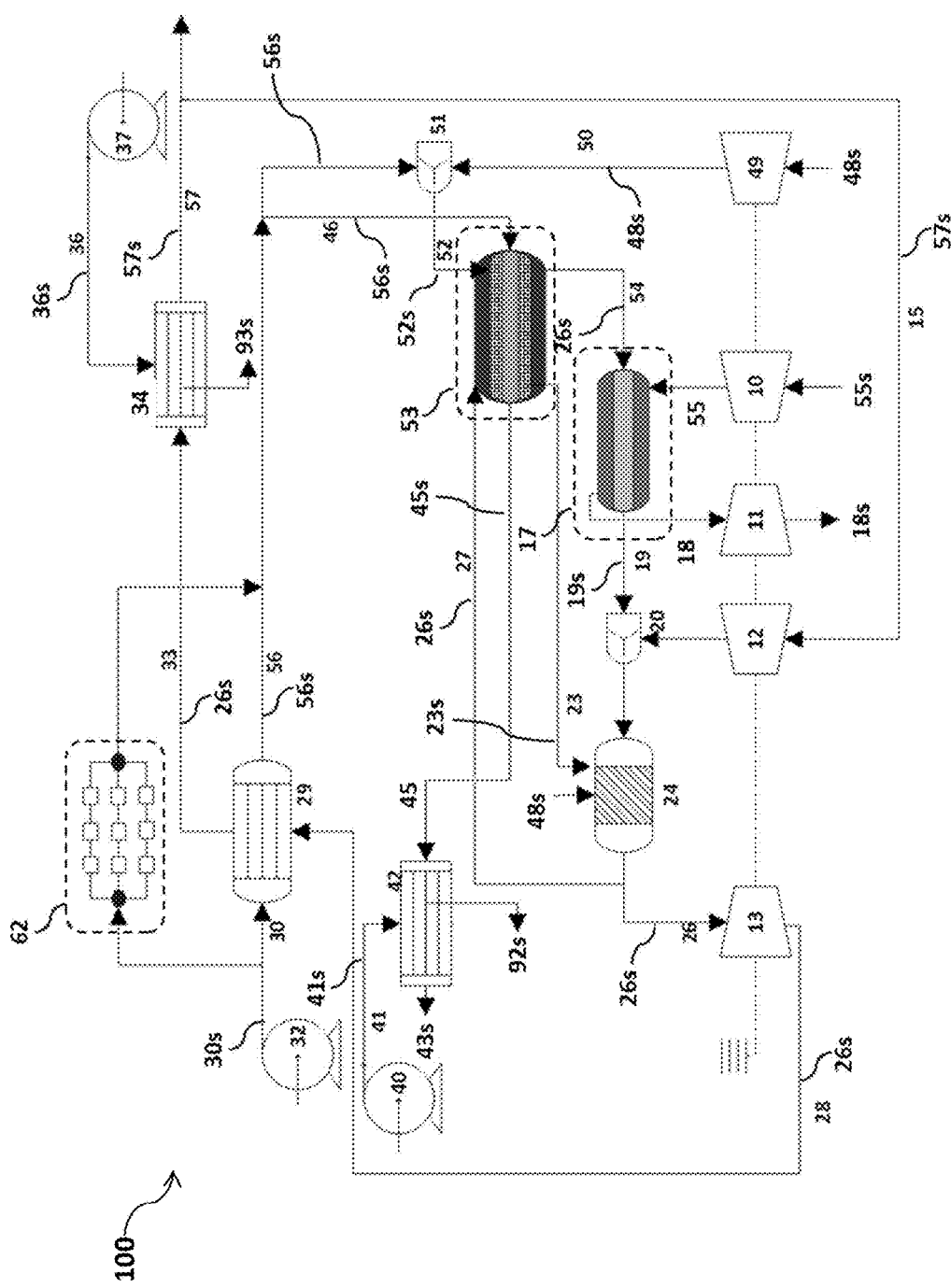
FIG. 1B is a process flow diagram (PFD) of an alternative embodiment of the power generation system.
Figure 1C:
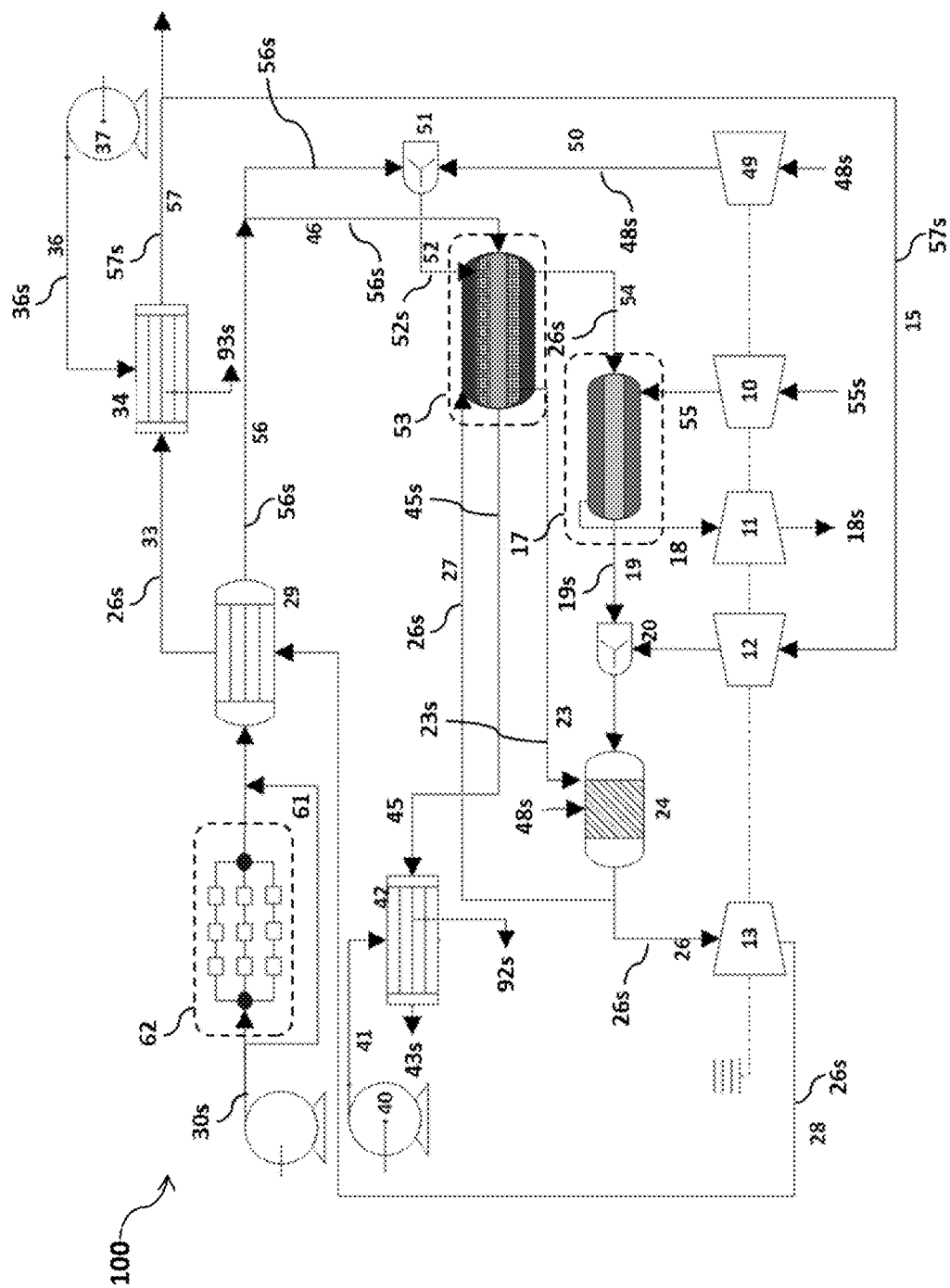
FIG. 1C is a process flow diagram (PFD) of an alternative embodiment of the power generation system.
Figure 1D:
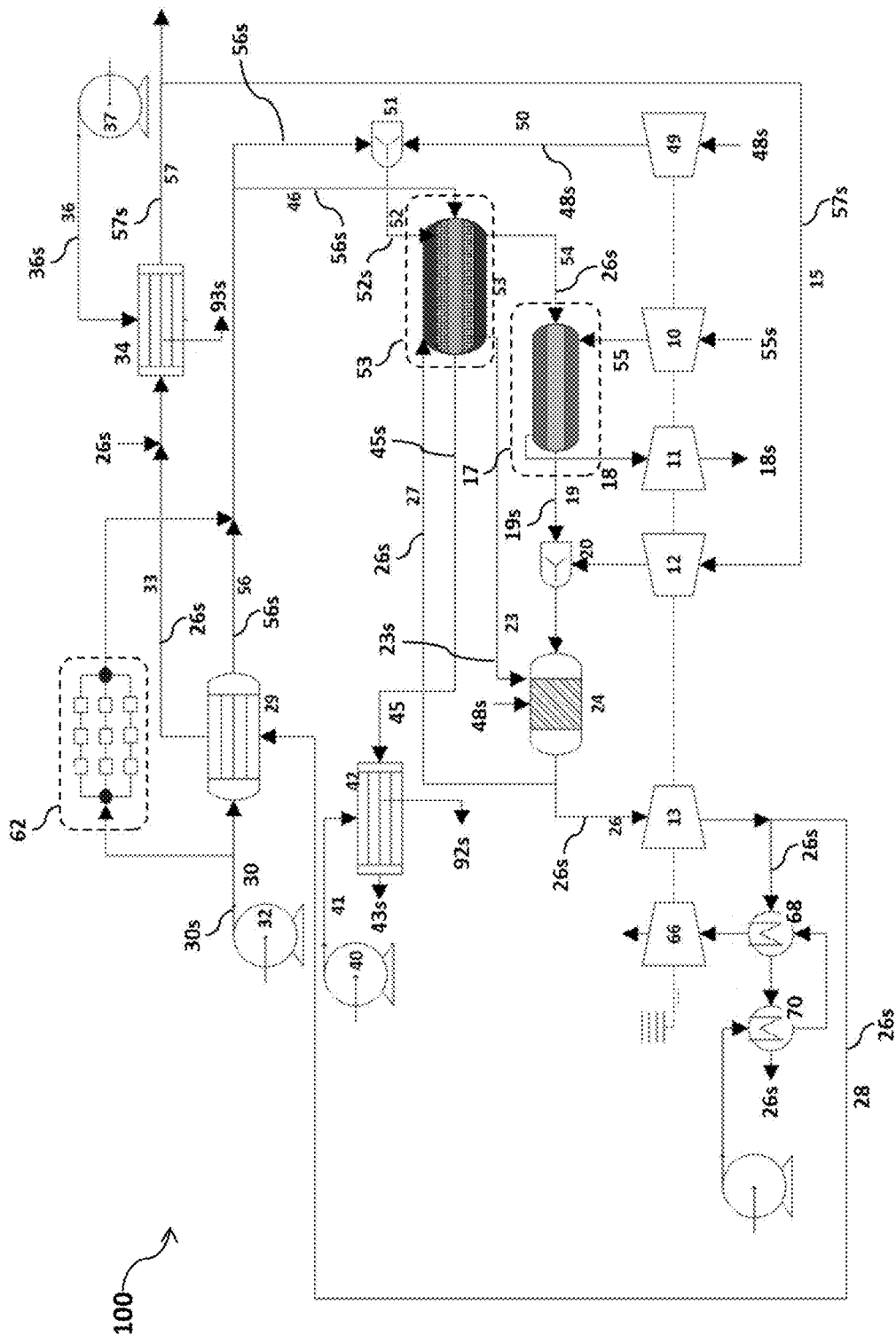
FIG. 1D is a process flow diagram (PFD) of an alternative embodiment of the power generation system.

Referring now to FIGS. 1B, 1C, and 1D, in some preferred embodiment, the power generation system 100 includes a solar HRSG 62 in addition to the HRSG 29. The solar HRSG 62 may be located in a series arrangement with the HRSG 29, as shown in FIG. 1C, or in a parallel arrangement with the HRSG 29, as shown in FIGS. 1B and 1D. In the embodiments, where the solar HRSG 62 is connected to the HRSG 29 in a series arrangement, the solar HRSG 62 may act as an economizer. Accordingly, during the solar favorable periods, i.e. sunny hours of a day, the solar HRSG 62 may be utilized to preheat the second water stream 30$s$ to a temperature in the range of 40 to 95° C., preferably 50 to 90° C., preferably 60 to 85° C., preferably 70 to 80° C., before delivering the second water stream 30$s$ to the HRSG 29. Preferably, a bypass line 61, as shown in FIG. 1C, may be adapted to directly deliver the second water stream 30$s$ to the HRSG 29 without passing through the solar HRSG 62, during night or during solar off period, i.e. cloudy hours of a day. In the embodiments where the solar HRSG 62 is connected to the HRSG 29 in a parallel arrangement, the solar HRSG 62 may generate at least a portion of the steam that is configured to be supplied to a subsequent unit in the system. In both arrangements, i.e. the series arrangement or the parallel arrangement, the second water line 30 may be equipped with an illuminance control system that includes an illuminance sensor, an actuator, a valve, and a processing unit. The processing unit may be programmed to transmit a command signal to the actuator to close the valve to disconnect the solar HRSG 62, or open the valve to connect the solar HRSG 62, based on a receiving signal from the illuminance sensor.

In some embodiments, the power generation system 100 further includes a gas mixer 51 located downstream of the HRSG 29 and upstream of the membrane reformer assembly 53. The gas mixer 51 is fluidly connected to the HRSG 29 via a high-pressure (HP) steam line 56. Additionally, the gas mixer 51 is fluidly connected to a natural gas line 50 to mix a natural gas stream 48s with the HP steam 56s to form the natural gas/$H_2O$ stream 52s that is fed to the reaction zone of the membrane reformer assembly 53 via a reformer fuel line 52. The gas mixer 51 may preferably be operated at a pressure in the range of 2 to 20 bars, preferably 10 to 18 bars, preferably 12 to 16 bars, preferably about 15 bars.

In one embodiment, the gas mixer 51 operates in a pressure range of 2 to 20 bars, preferably 10 to 18 bars, preferably 12 to 16 bars, preferably about 15 bars, and the system further includes a first compressor 49 fluidly connected to the natural gas line 50 to pressurize the natural gas stream 48s to the pressure of the gas mixer 51, i.e. a pressure range of 2 to 20 bars, preferably 10 to 18 bars, preferably 12 to 16 bars, preferably about 15 bars, before delivering the natural gas stream 48s thereto. Preferably, the gas mixer may have a propeller to effectively mix a plurality of gaseous streams in a continuous fashion (as seen in FIG. 1A-1D).

In a preferred embodiment, a swirler is secured at the reaction zone inlet 220 of the membrane reformer assembly 53 to expand and agitate the natural gas/$H_2O$ stream 52s in the reaction zone. Having a swirler at the reaction zone inlet 220 may enhance a yield of formation of syngas in the reaction zone, due to an increase in a residence time of the natural gas/$H_2O$ stream 52s and a larger effective surface contact of the natural gas and steam with the catalyst 208.

In some preferred embodiments, a second high-pressure (HP) steam line 46 fluidly connects the HP steam line 56 to the sweep zone inlet 224 of the membrane reformer assembly 53 to deliver a portion of steam 56s generated in the HRSG 29 to the sweep zone 206. Flowing steam 56s to the sweep zone 206 of the membrane reformer assembly 53 may sweep the molecular hydrogen 214 present in the sweep zone and subsequently forms a $H_2/H_2O$ stream 45s. In addition, a first condenser 42 is located downstream of the membrane reformer assembly 53 and fluidly connected to the sweep zone outlet 226 via a hydrogen line 45. The first condenser 42 lowers a temperature of the $H_2/H_2O$ stream 45s to a temperature below the boiling point of water, i.e. 100° C., to condense water present in the $H_2/H_2O$ stream 45s and to form a hydrogen stream 43s and a first purified water stream 92s. Lowering the temperature of the $H_2/H_2O$ stream 45s may be carried out by heat exchanging the $H_2/H_2O$ stream 45s with a first water stream 41s that is delivered to the first condenser 42 with a first water line 41 and a first pump 40.

In another preferred embodiment, a second condenser 34 is also located downstream of and fluidly connected to the HRSG 29 via a third exhaust line 33. The second condenser 34 further lowers a temperature of the exhaust stream 26s to a temperature below the boiling point of water, i.e. 100° C., to condense water present in the exhaust stream 26s and to form a $CO_2$ stream 57s and a second purified water stream 93s. Lowering the temperature of the exhaust stream may be carried out by heat exchanging the exhaust stream with a third water stream 36s that is delivered to the second condenser 34 with a third water line 36 and a third pump 37.

Accordingly, each of the first and the second condensers may be a heat exchanger, a cooling system, or a refrigeration system, although the condenser type is not meant to be limiting and various other condensers may also be used. Said condensers are configured to separate water from a gaseous mixture, either the $H_2/H_2O$ stream 45s or the exhaust stream, by cooling the gaseous mixture to a temperature below the boiling point of water, i.e. 100° C.

In some embodiments, the power generation system 100 further includes a $CO_2$ line 57 fluidly connected to the second condenser 34, a $CO_2$ recycle line 15 that fluidly connects the $CO_2$ line 57 to the oxygen line 19 with or without a second gas mixer 20, and a second compressor 12 fluidly connected to the $CO_2$ recycle line 15. The $CO_2$ line 57 delivers the $CO_2$ stream 57s to a downstream plant, wherein $CO_2$ may be captured or sequestered. The $CO_2$ recycle line 15 and the second compressor 12 delivers at least a portion of the $CO_2$ stream 57s to the oxygen line 19 to mix said portion of the $CO_2$ stream 57s with an oxygen-enriched stream 19s that egresses the permeate zone 304 of the ITM assembly 17. In a preferred embodiment, the $CO_2$ line 57 is substantially the same as the exhaust recycle line 27.

In one embodiment, the power generation system 100 further includes one or more flow control units to control a volumetric flow rate of an oxygen-enriched stream 19s (that flows inside the oxygen line 19) based on a volumetric flow rate of the hydrogen-depleted syngas stream 23s (that flows inside the syngas line 23). In view of that, the flow control unit may include a flowmeter disposed on the oxygen line 19 that is configured to determine the volumetric flow rate of the oxygen-enriched stream 19s to generate a flow rate signal. Additionally, the flow control unit may include a control valve disposed on the syngas line 23, which is configured to control the volumetric flow rate of the hydrogen-depleted syngas stream 23s. The control valve may be a check valve, a ball valve, a gate valve, or a diaphragm valves, although the valve type is not meant to be limiting and various other type of valves may also be used. Furthermore, the flow control unit may include a flow controller that is configured to receive the flow rate signal from the flowmeter, and to transmit an output signal to the control valve. The flow controller may refer to a programmable hardware device that is adapted to adjust the volumetric flow rate of the hydrogen-depleted syngas stream 23s based on the volumetric flow rate of the oxygen-enriched stream 19s.

Figure 1E:
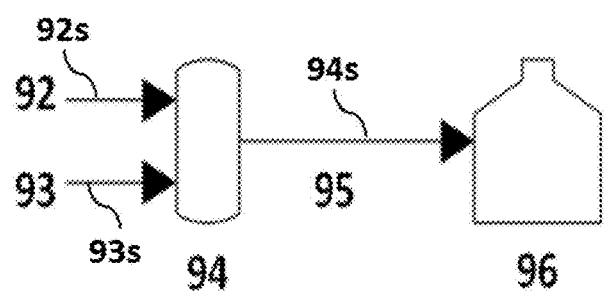
FIG. 1E is a schematic diagram of a water treatment plant in the power generation system.

Referring to FIG. 1E, in one embodiment, the power generation system 100 further includes a water treatment plant 94 located downstream of and fluidly connected to the first condenser 42 via a first purified water line 92 and downstream of and fluidly connected to the second condenser 34 via a second purified water line 93. The water treatment plant as used herein refers to a series of operational units, e.g. chlorination units, sedimentation units, UV radiation units, filtration units, reverse osmosis units, etc. that produces distilled water for industrial applications and/ or drinking water for domestic use. A distilled water stream 94s may be delivered to a water reservoir 96 via a distilled water line 95.

In some embodiments, each of the lines that carry a gaseous stream in the system, e.g. the natural gas line 50, the HP steam line 56, the second HP steam line 46, the reformer fuel line 52, the syngas line 23, the oxygen line 19, the hydrogen line 45, the exhaust line 26, the second exhaust line 28, the third exhaust line 33, the exhaust recycle line 27, the $CO_2$ line 57, and the $CO_2$ recycle line 15 are substantially the same. Accordingly, a diameter of each of said lines may vary depending on the volumetric flow rate of the gaseous stream present in that line, and may range from about 1 cm to about 20 cm, preferably from about 2 cm to about 15 cm, preferably from about 3 cm to about 12 cm, preferably from about 5 cm to about 10 cm. Furthermore, a thickness of each of said lines may also vary depending on the pressure and the temperature of the gaseous stream present in that line. For example, in one embodiment, the temperature of the gaseous stream is in the range of 600 to 1,000° C., preferably 700 to 900° C., wherein the thickness of the line that carries that gaseous stream is within the range of 2 to 50 mm, preferably 5 to 30 mm, more preferably 8 to 20 mm. Also, a material type of each of the aforementioned lines may vary depending on the temperature, pressure, and the type of the carrying gaseous stream. For example, in one embodiment, the temperature of the gaseous stream is in the range of 600 to 1,000° C., preferably 700 to 900° C., and the pressure of the gaseous stream is within the range of 5-50 bars, preferably 10-40 bars, more preferably 20-30 bars. Accordingly, the line that carries a gaseous stream with the above mentioned temperature and pressure may be made of a high-temperature duty metal or a metal alloy with an alumina liner that covers an interior of the line. In general, each of said lines may preferably be made of a high-temperature duty metal or a metal alloy to bear a pressure up to 50 bars, preferably up to 100 bars, even more preferably up to 150 bars, and to endure a temperature up to 1,500° C., preferably 2,000° C., more preferably 2,500° C.

In some other embodiments, each of the lines that carry a liquid stream in the system, e.g. the first, the second, and the third water line, and the first and the second purified water lines are substantially the same. Accordingly, a diameter of each of said lines may vary depending on the volumetric flow rate of the liquid stream present in that line, and may range from about 1 cm to about 20 cm, preferably from about 2 cm to about 15 cm, preferably from about 3 cm to about 12 cm, preferably from about 5 cm to about 10 cm. Furthermore, a thickness of each of said lines may also vary depending on the pressure of the liquid stream present in that line. For example, in one embodiment, the pressure of the liquid stream is in the range of 1 to 10 bars, preferably 2 to 8 bars, wherein the thickness of the line that carries the liquid stream is within the range of 2 to 20 mm, preferably 5 to 15 mm, more preferably 8 to 12 mm. Also, a material type of each of the aforementioned lines may vary depending on the temperature, pressure, and the type of the carrying liquid stream. Preferably, an interior surface of the lines that carries a liquid stream in the system is coated with a polymeric material, e.g. epoxy or vinyl ester, or a ceramic material, e.g. silica or alumina, to prevent oxidation and corrosion.

The power generation system 100 is a large-scale manufacturing plant, wherein the system may preferably generate about 10 to 100 ton/day, preferably, 20 to 90 ton/day, more preferably 30 to 80 ton/day of hydrogen gas. In a preferred embodiment, the power generation system has a hydrogen extraction factor in the range of 0.3 to 0.95, preferably 0.5 to 0.92, preferably 0.8 to 0.91, preferably about 0.9. The term "hydrogen extraction factor" as used herein refers to a ratio of the amount of hydrogen that is produced to the hydrogen that is theoretically intended to be produced by the power generation system. In view of the hydrogen extraction factor, an annualized cost of hydrogen is in the range of 20 to 80 $/GJ, preferably 25 to 70 $/GJ, preferably 30 to 60 $/GJ.

In another preferred embodiment, the power generation system has an auxiliary fuel factor, which is in the range of 0.4 to 1.5, preferably 0.5 to 1.3, preferably 0.6 to 1.2, preferably 0.7 to 1.0, preferably about 0.8. The term "auxiliary fuel factor" as used herein refers to a ratio of the amount of the natural gas stream reformed in the reaction zone to the amount of the natural gas stream that is optionally supplied directly to the combustor. In view of the auxiliary fuel factor, an annualized cost of hydrogen is in the range of 20 to 80 $/GJ, preferably 25 to 50 $/GJ, preferably 30 to 40 $/GJ.

Considering a specific energy of hydrogen, which is in the range of 120 to 140 MJ/kg (mega joules per kilogram) of hydrogen gas at various hydrogen pressure, the power generation system generates an electric power in the range of 1 to 10 MW (megawatt), preferably 2 to 9 MW, preferably 3 to 8 MW, preferably 4 to 6 MW, preferably about 4.8 MW just from the hydrogen produced by the system. Considering the power generated from combusting the syngas, the system may generate an electric power in the range of 5 to 15 MW (megawatt), preferably 6 to 12 MW, preferably 7 to 10 MW, preferably about 8 MW.

Furthermore, the amount of purified water produced by the power generation system may be within the range of 50 to 150 ton/day, preferably 55 to 120 ton/day, preferably 60 to 100 ton/day, preferably 70 to 90 ton/day.

In addition, the amount of $CO_2$ that may be captured is in the range of 300 to 600 ton/day, preferably 350 to 550 ton/day, preferably 400 to 500 ton/day, preferably about 450 ton/day, which is equivalent to about 80 to 150 kg of $CO_2$ per one gigajoules of hydrogen gas produced (kg $CO_2$/GJ $H_2$), or preferably about 100 to 120 kg $CO_2$/GJ $H_2$. In one embodiment, the temperature of the exhaust stream that exits the combustor is in the range of 500-2,000° C., preferably 800-1,500° C., more preferably 900-1,200° C., and the power generation system has a total $CO_2$ emission in the range of 120 to 180 kg $CO_2$/GJ $H_2$, preferably 140 to 165 kg $CO_2$/GJ $H_2$. Accordingly, an overall efficiency of the power generation system may vary in the range of 0.3 to 0.6, preferably 0.32 to 0.5, more preferably 0.33 to 0.45.

An overall efficiency of the power generation system may vary in the range of 0.3 to 0.6, preferably 0.32 to 0.5, more preferably 0.33 to 0.45. In a preferred embodiment, the temperature of the exhaust stream that exits the combustor is in the range of 500-2,000° C., preferably 800-1,500° C., more preferably 900-1,200° C., and the power generation system has an overall efficiency of 0.3 to 0.6, preferably 0.32 to 0.5, more preferably 0.33 to 0.45. Accordingly, an annualized cost of hydrogen may be in the range of 10 to 40 $/GJ, preferably 15 to 35 $/GJ, preferably 20 to 33 $/GJ.

According to a second aspect, the present disclosure relates to a process for generating power using the power generation system.

The process involves mixing the natural gas stream with steam in the gas mixer to form the natural gas/$H_2O$ stream, and further delivering the natural gas/$H_2O$ stream to the reaction zone of the membrane reformer assembly. The natural gas stream and steam may be mixed in the gas mixer under an elevated pressure in the range of 2 to 20 bars, preferably 10 to 18 bars, preferably 12 to 16 bars, preferably about 15 bars.

The natural gas stream may preferably be a methane stream, i.e. having at least 85 vol %, preferably at least 90 vol %, preferably at least 95 vol %, preferably at least 98 vol % of methane, that contains less than 10.0 vol %, preferably less than 5.0 vol %, preferably less than 2.0 vol % of ethane, and other hydrocarbon compounds (e.g. alkanes, alkenes, alkynes, cycloalkanes, etc.) having a carbon content in the range of $C_2$-$C_{20}$, preferably $C_2$-$C_{12}$, more preferably $C_3$-$C_8$. The natural gas stream may also contain less than 5.0 vol %, preferably less than 2.0 vol % of oxygen, nitrogen, and water vapor. The natural gas stream may further include less than 500 ppm, preferably less than 100 ppm, and more preferably less than 50 ppm of sulfur. Further to the above, the natural gas stream may include traces amount (preferably less than 0.1 vol %) of hydrogen sulfide, argon, helium, nitrogen oxides (i.e. nitric oxide, nitrous oxide, nitrogen dioxide), or sulfur dioxide. Each volume percentile is relative to the total volume of the natural gas stream. A pressure of the natural gas stream may be adjusted by the compressor to be in the range of 2 to 20 bars, preferably 10 to 18 bars, preferably 12 to 16 bars, preferably about 15 bars, whereas a temperature of the natural gas stream may be adjusted to be within the range of 500-1,000° C., preferably 600-900° C. The natural gas stream is in a gaseous phase before entering the gas mixer. In another embodiment, a portion of the natural gas stream is delivered to one of the combustor inlets, i.e. the fuel inlet, to combust with the hydrogen-depleted syngas stream in the presence of the oxidant in the combustor.

At least a portion of the natural gas/$H_2O$ stream is further converted into the syngas stream in the presence of the catalyst in the reaction zone of the membrane reformer assembly. Once syngas is formed in the reaction zone, a portion of molecular hydrogen present in the syngas is transported across the hydrogen-permeable membrane to the sweep zone leaving behind the hydrogen-depleted syngas stream.

The steam that is generated in the HRSG contains at least 95 vol %, preferably at least 98%, more preferably at least 99 vol %, of water vapor and traces amount, i.e. less than 5 vol %, preferably less than 2 vol %, preferably less than 1 vol % of $CO_2$, oxygen, nitrogen, and/or carbonic acid, with each volume percentile being relative to the total volume of the steam. In view of that, the natural gas/$H_2O$ stream contains at least 98 vol %, preferably at least 99 vol % of methane and water vapor, wherein a molar ratio of methane to water vapor in the natural gas/$H_2O$ stream is in the range of 5:1 to 1:5, preferably 3:1 to 1:3, preferably 2:1 to 1:2, preferably about 1:1. Furthermore, the natural gas/$H_2O$ stream may contain less than 2 vol %, preferably less than 1 vol % of ethane, oxygen, $CO_2$, nitrogen, carbonic acid, etc. Each volume percentile is relative to the total volume of the natural gas/$H_2O$ stream. The natural gas/$H_2O$ stream may have a temperature in the range of 900-1,300° C., preferably 1,000-1,200° C., and a pressure in the range of 2 to 20 bars, preferably 10 to 18 bars, preferably 12 to 16 bars, preferably about 15 bars.

The syngas stream, i.e. the stream that is formed in the reaction zone right before hydrogen is permeated through the hydrogen-permeable membrane, may preferably contain at least 90 vol %, preferably at least 95 vol %, preferably at least 98 vol % of carbon monoxide and hydrogen, wherein a molar ratio of hydrogen to carbon monoxide in the syngas stream is in the range of 10:1 to 1:2, preferably 8:1 to 1:1.5, preferably 5:1 to 1:1, preferably about 3:1. Furthermore, the syngas stream may contain less than 5 vol %, preferably less than 2 vol %, preferably less than 1 vol % of methane, ethane, water vapor, etc. Each volume percentile is relative to the total volume of the syngas stream produced.

The process further involves flowing steam to the sweep zone to sweep the molecular hydrogen that are permeated through the hydrogen-permeable membrane and to form a $H_2/H_2O$ stream. The steam that flows inside the sweep zone may be a high-pressure steam with a pressure in the range of 10 to 18 bars, preferably 12 to 16 bars, or a medium-pressure steam with a pressure in the range of 5 to 10 bars, preferably 6 to 8 bars, or a low-pressure steam with a pressure in the range of 1 to 5 bars, preferably 2 to 4 bars. To get a medium-pressure or a low-pressure steam, a throttle valve may be adjusted on the second high-pressure line to reduce the pressure of the steam.

The $H_2/H_2O$ stream may preferably contain at least 90 vol %, preferably at least 95 vol %, preferably at least 98 vol % of water vapor and hydrogen. Also, it may contain less than 5 vol %, preferably less than 2 vol %, preferably less than 1 vol % of nitrogen, carbonic acid, etc. Each volume percentile is relative to the total volume of the $H_2/H_2O$ stream.

The process further involves condensing the $H_2/H_2O$ stream in the first condenser to form a hydrogen stream and a first purified water stream. The hydrogen stream may preferably contain at least 95 vol %, preferably at least 98 vol %, preferably at least 99 vol % of hydrogen, and less than 5 vol %, preferably less than 2 vol %, preferably less than 1 vol % of nitrogen, with each volume percentile being relative to the total volume of the hydrogen stream. The first purified water stream may preferably contain at least 99 vol %, preferably at least 99.5 vol %, preferably at least 99.9 vol % of water.

The process may further involve combusting the hydrogen stream to generate power. A portion of the hydrogen stream may also be transferred to a hydroprocessing unit such as a hydrocracker or a hydrotreater (i.e. hydrodesulfurization), or an ammonia manufacturing plant, or a downstream petrochemical processing plant with a hydrogen gas demand.

The process may further involve combusting the hydrogen-depleted syngas stream and optionally a portion of the natural gas stream in the presence of the oxidant via an oxy-combustion reaction to form the exhaust stream. The hydrogen-depleted syngas stream is delivered to the combustor after separation of hydrogen from the syngas stream, and thus contains at least 50 vol %, or at least 60 vol %, or at least 70 vol %, or at least 80 vol %, or at least 90 vol % of carbon monoxide, and less than 50 vol %, or less than 40 vol %, or less than 30 vol %, less than 20 vol %, or less than 10 vol % of hydrogen. The hydrogen-depleted syngas stream may be at a temperature in the range of 500-1,000° C., preferably 600-900° C., and a pressure in the range of 1 to 5 bars, preferably 2 to 4 bars. The term "oxidant" as used herein refers to a gaseous stream that provides oxygen to an interior of the combustor. The oxidant preferably comprises the oxygen-enriched stream that is produced by the ITM assembly.

The exhaust stream, which is formed upon combusting the hydrogen-depleted syngas stream and optionally a portion of the natural gas stream in the presence of the oxidant and via an oxy-combustion reaction, contains at least 99 vol %, preferably at least 99.5 vol %, preferably at least 99.9 vol % of carbon dioxide and water vapor, and may also include less than 1.0 vol %, preferably less than 0.5 vol % of carbon monoxide, nitrogen oxides (i.e. nitric oxide, nitrous oxide, nitrogen dioxide), sulfur dioxide, argon, helium, and/or carbonic acid. In one embodiment, the exhaust stream has a temperature in the range of 500-2,000° C., preferably 800-1,500° C., more preferably 900-1,200° C., and a pressure in the range of 5-50 bars, preferably 10-40 bars, more preferably 15-30 bars.

The process further involves expanding the exhaust stream in the expander to generate power. As used herein, the term "expanding" refers to a process whereby a high pressure gaseous stream is expanded in an expander (e.g. an internal combustion engine, a turbine, etc.) to generate power. For example, in one embodiment, the expander is a turbine and the exhaust stream is flowed through vanes of the turbine to drive the turbine vanes and to generate shaft work.

After expanding the exhaust stream in the expander, the temperature of the exhaust stream may drop to a temperature in the range of 400-1,000° C., preferably 500-800° C., and the pressure of the exhaust stream may drop to a pressure of less than 10 bars, or preferably less than 5 bars. Consequently, the exhaust stream may turn into a double phase stream (i.e. containing both a gaseous phase and a liquid phase) due to the formation of water droplets in the exhaust stream. Preferably, the amount of droplets in the exhaust stream after expansion is less than 1.0 vol %, preferably less than 0.5 vol %, relative to the total volume of the exhaust steam.

In some embodiments, the process further involves delivering at least a portion of the exhaust stream to the heating zone of the membrane reformer assembly to heat the reaction zone to a temperature in the range of 500 to 1,200° C., preferably 600-1,000° C., preferably 700-900° C. Another portion of the exhaust stream may also be utilized to heat a process stream in the power generation system, or any process stream of a separate power plant, a chemical processing plant, or a refining plant. For example, in one embodiment, a portion of the exhaust stream 26s is used to preheat water in a first heat exchanger 70, and further evaporate water in a second heat exchanger 68 to form vapor to operate a steam turbine 66. The cooled exhaust stream may further be mixed with the remaining exhaust stream that is received from the HRSG 29 and delivered to the second condenser 34. This embodiment is depicted in FIG. 1D.

Additionally, the exhaust stream may be utilized to run pneumatic actuators and/or pneumatic systems in said processing plants.

In some embodiments, the process further involves delivering the oxygen-containing stream to the feed zone of the ITM assembly via the feed line and the ITM compressor. The oxygen-containing stream may contain at least 10 vol %, preferably at least 20 vol %, preferably at least 40 vol %, preferably at least 60 vol %, preferably at least 80 vol %, preferably at least 90 vol %, preferably at least 95 vol %, preferably at least 98 vol %, preferably at least 99 vol % of oxygen; and no more than 80 vol %, preferably no more than 60 vol %, preferably no more than 40 vol %, preferably no more than 20 vol %, preferably no more than 10 vol %, preferably no more than 5 vol %, preferably no more than 2 vol % of nitrogen. In addition, the oxygen-containing stream may contain less than 1.0 vol %, preferably less than 0.5 vol % of hydrogen, argon, carbon dioxide, neon, helium, and water vapor.

An oxygen partial pressure of the oxygen-containing stream may preferably be at least 200 torr, or at least 350 torr, or at least 500 torr, or at least 600 torr. In a preferred embodiment, the oxygen-containing stream is compressed with the ITM compressor, wherein a pressure of the oxygen-containing stream is within the range of 1-50 bars, preferably 5-40 bars, more preferably 10-30 bars. In addition, the oxygen-containing stream is heated, wherein a temperature of the oxygen-containing stream is within the range of 800-1,200° C., preferably 900-1,100° C. Additionally, in one embodiment, a water content of the oxygen-containing stream is reduced to a water content of less than 1.0 vol %, preferably less than 0.5 vol %, more preferably less than 0.1 vol %, prior to be fed to the feed zone of the ITM assembly. After the oxygen-containing stream is delivered to the feed zone, the molecular oxygen of the oxygen-containing stream are transported across the ion transport membrane to the permeate zone leaving behind the oxygen-depleted stream.

The exhaust stream that egresses the heating zone of the membrane reformer assembly is further delivered to the permeate zone inlet of the ITM assembly to sweep the molecular oxygen present in the permeate zone, and to form the oxygen-enriched stream, which includes the molecular oxygen, carbon dioxide, and water vapor, and is substantially free from nitrogen, i.e. less than 1.0 vol %, preferably less than 0.5 vol % of carbon monoxide, nitrogen, hydrogen, argon, helium, nitrogen oxides (i.e. nitric oxide, nitrous oxide, nitrogen dioxide), and/or sulfur dioxide, with the volume percentile being relative to the total volume of the oxygen-enriched stream. Preferably, an oxygen partial pressure in the oxygen-enriched stream is at least 600 torr, preferably at least 700 torr, more preferably 800 torr, even more preferably at least 1,000 torr.

Flowing the exhaust stream into the permeate zone of the ITM assembly may effectively increase an oxygen flux of the ITM, by sweeping away the molecular oxygen collected in the permeate zone of the ITM assembly.

The exhaust stream may be delivered to the permeate zone such that a flow direction of the exhaust stream in the permeate zone is co-current with a flow direction of the oxygen-containing stream in the feed zone. Preferably, in an alternative embodiment, the exhaust stream is delivered to the permeate zone such that a flow direction of the exhaust stream in the permeate zone is counter-current with a flow direction of the oxygen-containing stream in the feed zone.

The process further involves delivering the oxygen-enriched stream to the combustor to be combusted in the presence of the hydrogen-depleted syngas stream and optionally the natural gas stream. The oxygen-enriched stream may preferably be compressed before delivering to the combustor. In one embodiment, a swirler is secured at each of the combustor feed inlets, and the oxygen-enriched stream, the hydrogen-depleted syngas stream, and the natural gas stream are expanded and agitated with each of the swirlers before entering the combustor. The swirler may effective mix said gaseous streams inside the combustor.

In one embodiment, the oxygen-depleted stream, which egresses the ITM feed outlet of the ITM assembly, has a pressure in the range of 1 to 10 bars, preferably 5 to 8 bars, and a temperature in the range of 600-1,200° C., preferably 800-1,000° C. Therefore, the oxygen-depleted stream is expanded in the turbine 11 to generate shaft work. The oxygen-depleted stream includes at least 20 vol %, or at least 40 vol %, or at least 60 vol %, or at least 80 vol %, or at least 90 vol %, or at least 95 vol %, or at least 98 vol %, or at least 99 vol % of nitrogen; and no more than 80 vol %, preferably no more than 60 vol %, preferably no more than 40 vol %, preferably no more than 20 vol %, preferably no more than 10 vol %, preferably no more than 5 vol %, preferably no more than 2 vol % of oxygen. The oxygen-depleted stream may further includes less than 1 vol % of argon, carbon dioxide, neon, helium, hydrogen, and water vapor. Alternatively, a portion of the oxygen-depleted stream, which is rich in nitrogen, may be utilized in fertilizer industries. The oxygen-depleted stream may have an oxygen partial pressure within the range of 10 to 400 torr, preferably 50 to 300 torr. In the embodiments where an oxygen partial pressure of the oxygen-depleted stream is above 100 torr, preferably above 200 torr, a portion of the oxygen-depleted stream may be recycled to be mixed with the oxygen-containing stream to be delivered to the feed zone of the ITM assembly.

In one embodiment, only carbon dioxide and water vapor are present in the exhaust stream and the process further involves condensing the exhaust stream with the second condenser to form a $CO_2$ stream and a second purified water stream. The exhaust stream may be cooled to room temperature (i.e. 25° C.), preferably a temperature below room temperature and above water freezing point (e.g. 15° C.), at atmospheric pressure to form the liquid phase, which may also contain traces amount of carbonic acid. Subsequently, the liquid phase may be separated from the exhaust stream, for example via the condenser or a liquid-vapor separator.

The CO$_2$ stream mainly includes carbon dioxide and may also contain no more than 0.5 vol %, preferably no more than 0.1 vol % of nitrogen, hydrogen, carbon monoxide, argon, helium, methane, ethane, etc., with the volume percentile being relative to the total volume of the CO$_2$ stream.

In one embodiment, a portion of the CO$_2$ stream is mixed with the oxygen-enriched stream using a second gas mixer 20, which is fluidly connected to the CO$_2$ recycle line and the oxygen line.

In a preferred embodiment, the CO$_2$ stream is pure or substantially pure carbon dioxide having at least 99 vol %, preferably at least 99.5 vol %, more preferably at least 99.9 vol % carbon dioxide, relative to the total volume of the CO$_2$ stream. Accordingly, the process further involves sequestering the CO$_2$ stream, for example, by injecting the CO$_2$ stream into a geological formation, or capturing carbon dioxide by other means known to the skilled in the art. The CO$_2$ stream may also be utilized in supercritical extraction systems or in processes where a low/medium/high pressure CO$_2$ stream is demanded.

In one embodiment, the second purified water stream may preferably contain at least 99 vol %, preferably at least 99.5 vol %, preferably at least 99.9 vol % of distilled water. Accordingly, the process further involves delivering the first and the second purified water streams to a water treatment plant to produce distilled water.

Figure 11:
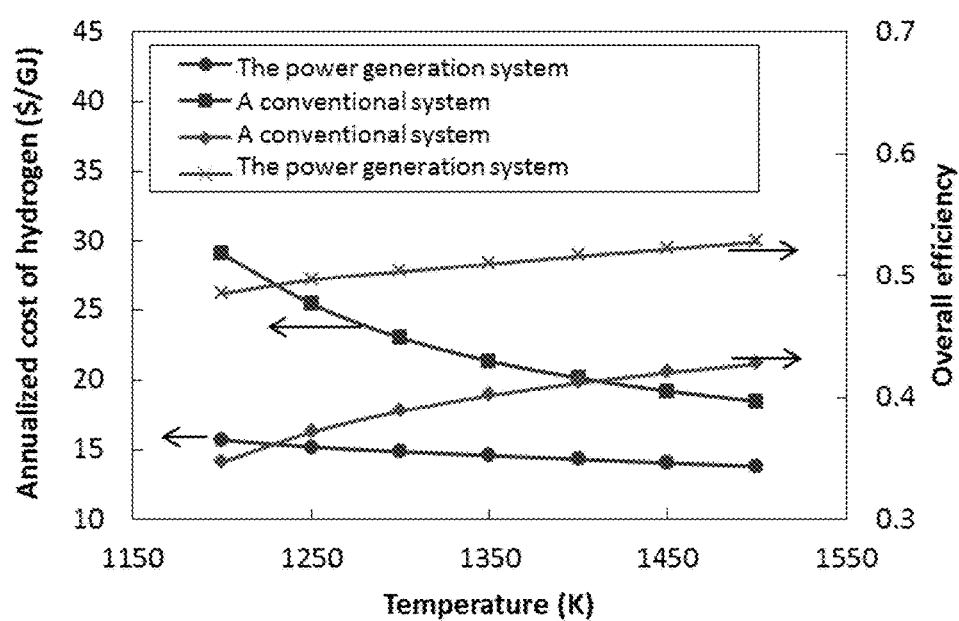
FIG. 11 represents a comparison of an annualized cost of hydrogen produced and an overall efficiency versus temperature of the exhaust stream that exits the combustor, for the power generation system and a conventional system.
Figure 12:
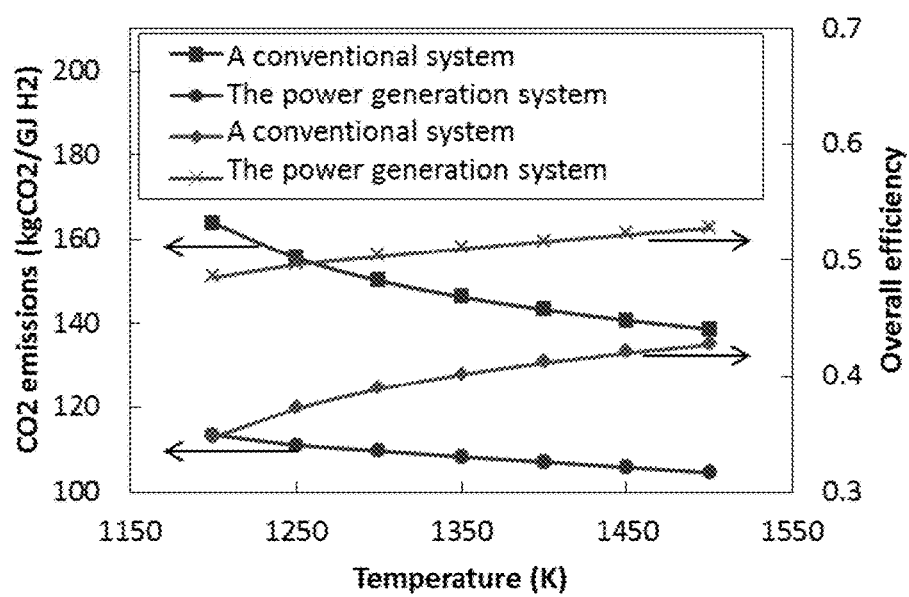
FIG. 12 represents a comparison of a total $CO_2$ emission and an overall efficiency versus temperature of the exhaust stream that exits the combustor, for the power generation system and a conventional system.

In a preferred embodiment, in the power generation system 100 as discussed, the energy required to operate the membrane reformer assembly 53, the ion transport membrane assembly 17, the first compressor 49, the second compressor 12, the ITM compressor 10, the first pump 40, the second pump 32, the third pump 37, and the HRSG 29 is partially or entirely produced from combusting the hydrogen-depleted syngas stream 23s and optionally the natural gas stream 48s in the combustor 24. In view of that, an overall efficiency of the power generation system may vary in the range of 0.3 to 0.6, preferably 0.32 to 0.5, more preferably 0.33 to 0.45, which is at least 5%, preferably at least 10%, preferably at least 15%, preferably at least 20% higher than a conventional power generating system, as shown in FIG. 11. In addition, the annualized cost of hydrogen produced by the system 100 is in the range of 10 to 40 $/GJ, preferably 15 to 35 $/GJ, preferably 20 to 33 $/GJ, which is about 10% to about 50%, preferably about 15% to about 40% lower than an annualized cost of hydrogen produced by a conventional power generating system, as shown in FIG. 11. Moreover, in one embodiment, a total CO$_2$ emission produced by the system 100 in the range of 100 to 160 kg CO$_2$/GJ H$_2$, preferably 110 to 125 kg CO$_2$/GJ H$_2$, which is about 10% to about 30%, preferably about 15% to about 25% lower than a total CO$_2$ emission produced by a conventional power generating system, as shown in FIG. 12.

The examples below are intended to further illustrate protocols for the power generation system and the process of generating power using thereof, and are not intended to limit the scope of the claims.

Example 1—the Technical and Economic Viability of H$_2$ Production in a Steam Natural Gas Reformer Integrated to an Oxy-Fuel Plant This study was carried out to assess the technical and economic viability of H$_2$ production in a natural gas membrane reformer, integrated to an Ion transport membrane (ITM)-oxy-combustion plant. The technical assessment of the plant involves the integration of the thermodynamics model of each plant component, the chemical equilibrium model for the reformer and membrane separation model (for oxygen and hydrogen gas). The plant economic assessment is based on annualized cost concept. The system thermo-economic performances are: reformer pressure, combustor exit temperature (CET), hydrogen extraction factor and the auxiliary fuel factor. Combustor exit temperature (CET)—is also the turbine inlet temperature and reformer temperature, since the thermodynamics model is implemented gate-to-gate. Hydrogen extraction factor (HEF)—is the fraction of the hydrogen produced in the M-SMR that is targeted to be extracted or produced from the plant. It depends on the hydrogen membrane size, operating temperature and pressure difference across the membrane. Auxiliary fuel factor (AFF)—it was used to depict the amount of natural gas fuel supplied directly to the combustor for increased heat energy production and expressed as a factor of natural gas reformed in the M-SMR.

Figure 4:
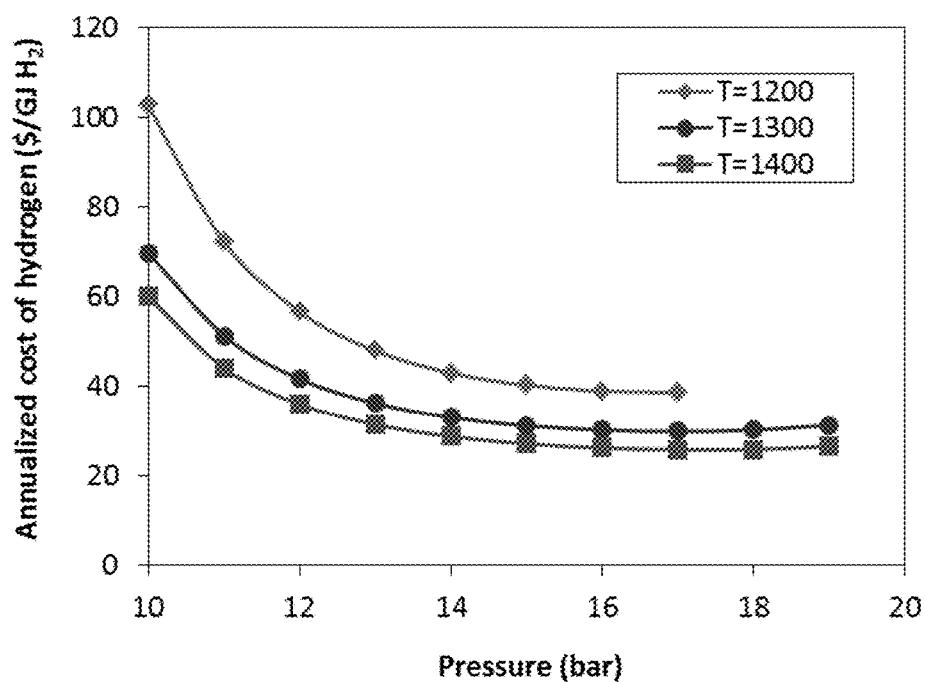
FIG. 4 represents an annualized cost of hydrogen produced versus operating pressure of the membrane reformer assembly at various temperature of an exhaust stream that exits the combustor.

FIG. 4 shows the effect of reformer pressure on the annualized cost of hydrogen (ACH) production at different CET the ACH becomes nearly constant at operating pressure of 15 bars. This implies that further increase in pressure does not significantly lead to a decrease in ACH. In fact the ACH starts to rise beyond P=16 bar for the case of 1300 K. Pressure (P=15 bar) is, therefore, adopted as the preferred reformer operating pressure of the system for minimum hydrogen cost.

Figure 5:
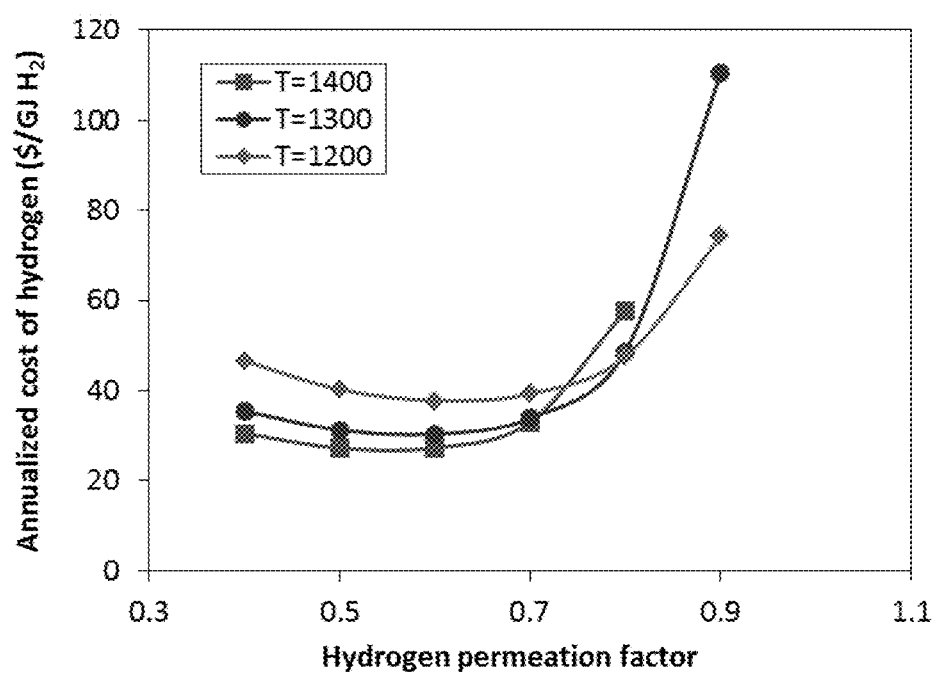
FIG. 5 represents an annualized cost of hydrogen produced versus hydrogen permeation factor at various temperature of the exhaust stream that exits the combustor.

At the preferred reformer pressure (P=15 bar), the minimum cost of hydrogen is achieved at hydrogen extraction factor of 0.6 as shown in FIG. 5. At lower hydrogen extraction factor (<0.6), more power is produced in the gas turbine; the investment cost of the ITM is also higher due to large amount of oxygen required for combustion. This implies that the effect of the high capital cost of the ITM outweighs the cost benefit from increased power production resulting in an increased ACH. On the other hand, for hydrogen extraction factor of more than 0.6, the capital cost of the ITM and the cost benefit from power production decreases. The reduction in the cost benefit from power production is more than the reduction in the capital cost of the ITM and leads to an increased ACH.

Figure 6:
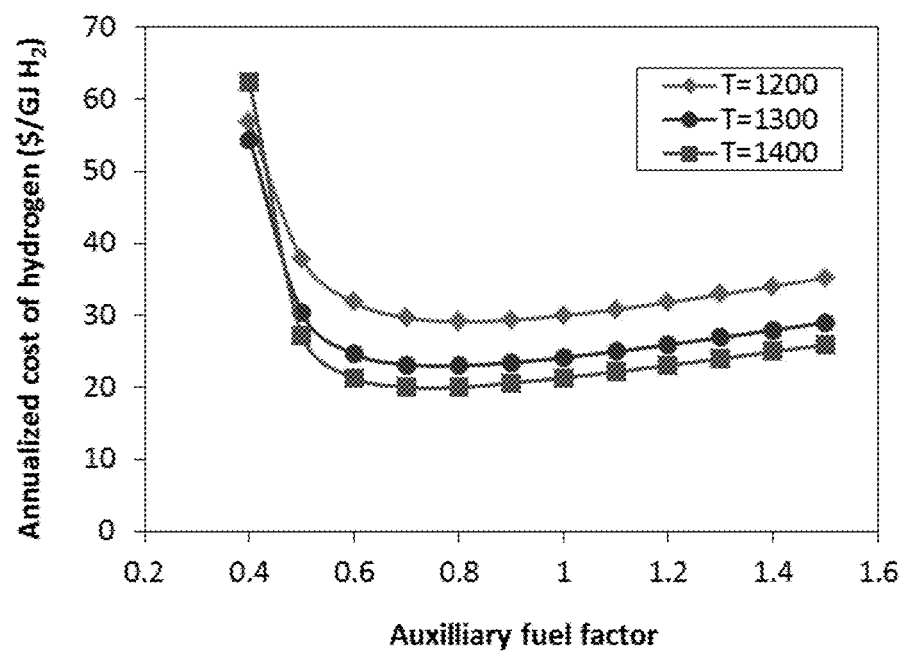
FIG. 6 represents an annualized cost of hydrogen produced versus auxiliary fuel factor at various temperature of the exhaust stream that exits the combustor.

In FIG. 6, it was shown that the minimum ACH at all CET is obtained at auxiliary fuel factor of 0.8. Below this preferred auxiliary fuel factor, the temperature of the ITM is low resulting in low oxygen permeation rate. This increases the size and the capital cost of the ITM. For auxiliary fuel factor of more than 0.8, the decreasing capital cost of the ITM does not overcome the additional fuel cost leading to more expensive hydrogen production. The preferred operating conditions for minimum ACH in the integrated system are thereby summarized in Table 1.

TABLE 1

System preferred operating condition.

| Reformer pressure | Hydrogen extraction factor | Auxiliary fuel factor |
|---|---|---|
| 15 bar | 0.9 | 0.8 |

Figure 7:
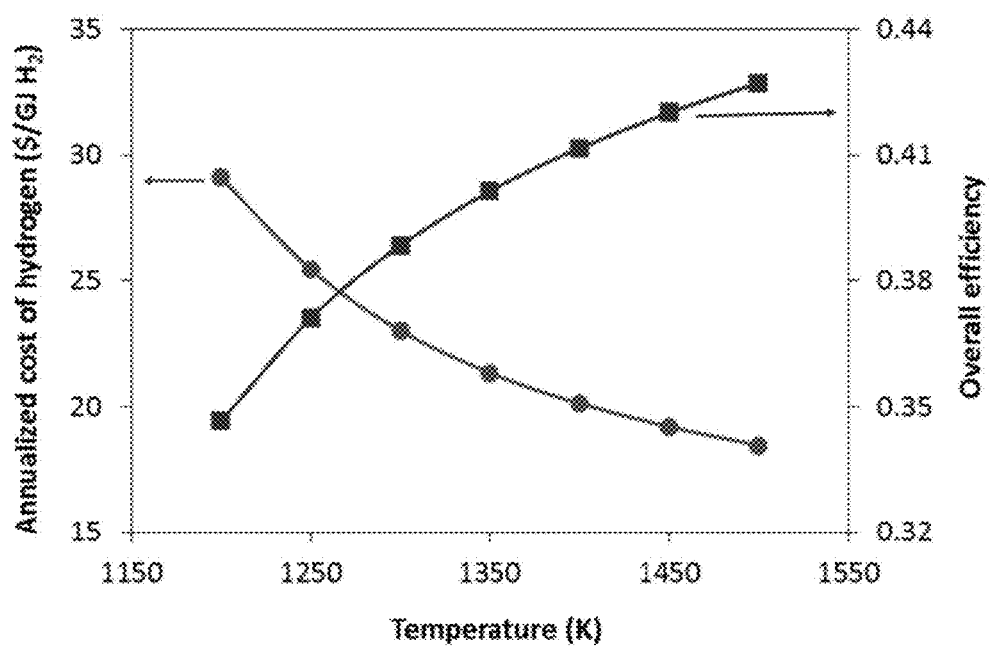
FIG. 7 represents an annualized cost of hydrogen produced and an overall efficiency of the power generation system versus temperature of the exhaust stream that exits the combustor.

At the preferred operating conditions given in Table 1, increasing the CET results in improved system efficiency as shown in FIG. 7. The improved system efficiency is attributed to the increased power production from the turbine and the associated reduction in the power consumed by the air and CO$_2$ compressor. At higher CET, the cost benefit of increased system power output at lower capital cost of ITM drives down the ACH as shown in FIG. 7. This suggests that the system should be operated at highest possible CET. There is, however, limitation on the operating temperature of gas tributes. Mitsubishi Heavy Industries company is currently developing a 1700° C.-class gas turbine [Ito, E., et al., Key Technologies for Ultra-High Temperature Gas Turbines, Mitsubishi Heavy Industries Technical Review, 2015. 52(2)]. With the development of such high temperature turbines, the cost of hydrogen production can further be reduced.

Figure 8:
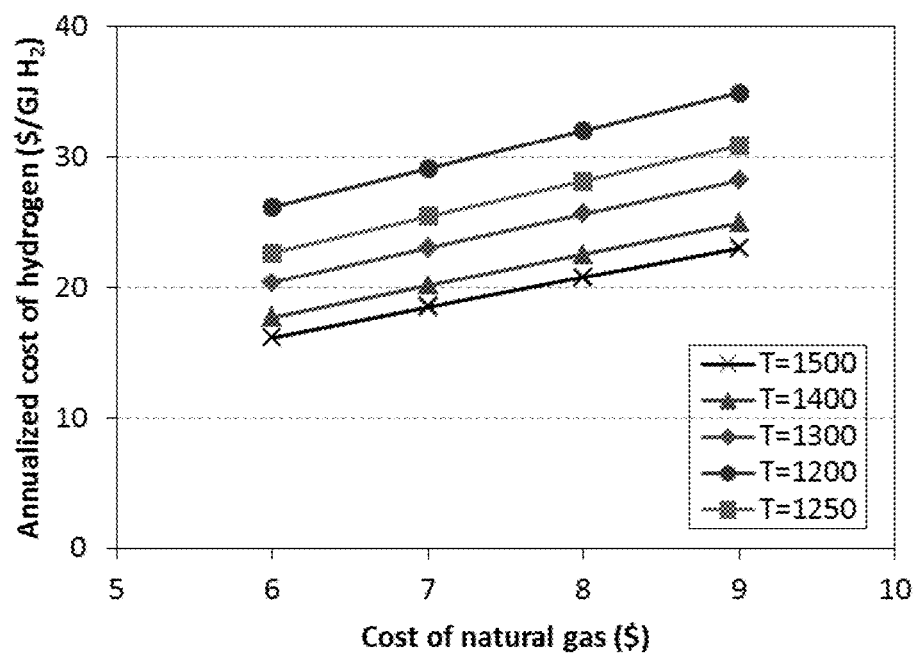
FIG. 8 represents an annualized cost of hydrogen produced versus a cost of natural gas at various temperature of the exhaust stream that exits the combustor.

The International Energy Agency (IEA) report stated that, for natural gas prices of $6-$9, the large-scale hydrogen production cost for captive cases ranges between $10 and $30 per GJ $H_2$. The ACH obtained in this study falls within the range suggest by the IEA for CET of about 1250 K or more, as shown in FIG. 8. The cost of hydrogen production moves to the lower price band as a result of increase in CET. This indicated that the CET is important to the profitability and viability of hydrogen production in membrane-steam natural gas reformer integrated to ITM oxy-combustor. Our studies also show that the ITM-air separation unit constitutes more than 50% plant investment cost. Substantial researches are currently on going in the development of high oxygen flux membrane. The high oxygen flux membrane could further reduce the hydrogen production cost below the cost envisaged by the International Energy Agency (IEA).

Figure 9:
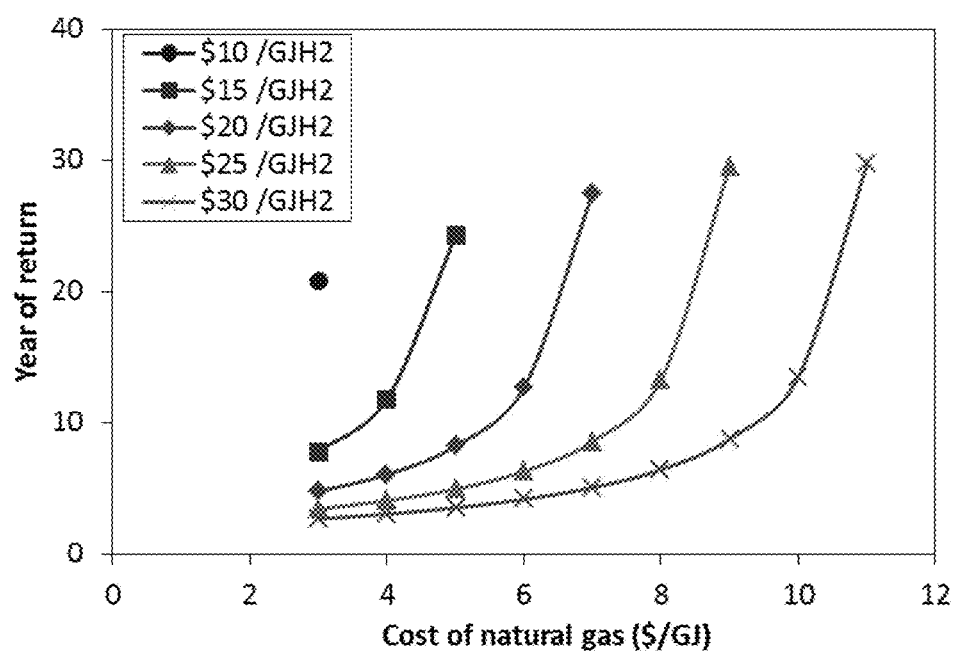
FIG. 9 represents a number of years of investment return versus the cost of natural gas at various annualized cost of hydrogen produced.

The industrial cost of hydrogen is not known, because most hydrogen produced are consumed within the same facility. The prices quoted by the international energy agency (IEA) shows the sensitivity of natural gas cost on the year of return (YOR) of the investment. FIG. 9 shows that at $10 per GJ $H_2$ purchase price of hydrogen, the minimum expected year of return (YOR) on investment is about 21 years which is comparable to the life span of the system that is assumed as 25 years. This shows that system will not be economically feasible at $10 per GJ $H_2$ purchase price of hydrogen. The system, however, becomes economically feasible at higher purchase price (and natural gas price of $3/GJ), as the maximum expected YOR is less than 8 years. For a given hydrogen purchase price, there exists a natural gas price beyond which the expected YOR increases drastically. This gives an indication of the maximum price of natural gas for hydrogen production to be economically feasible for a given Hydrogen purchase price. At hydrogen purchase price of $15 per GJ $H_2$, the maximum natural gas price for the system to be economically feasible is $4 per GJ with expected YOR of 11.85 years as compared to natural gas price of $10 per GJ and expected YOR of 13.58 at $30 per GJ $H_2$ hydrogen purchase price.

Figure 10:
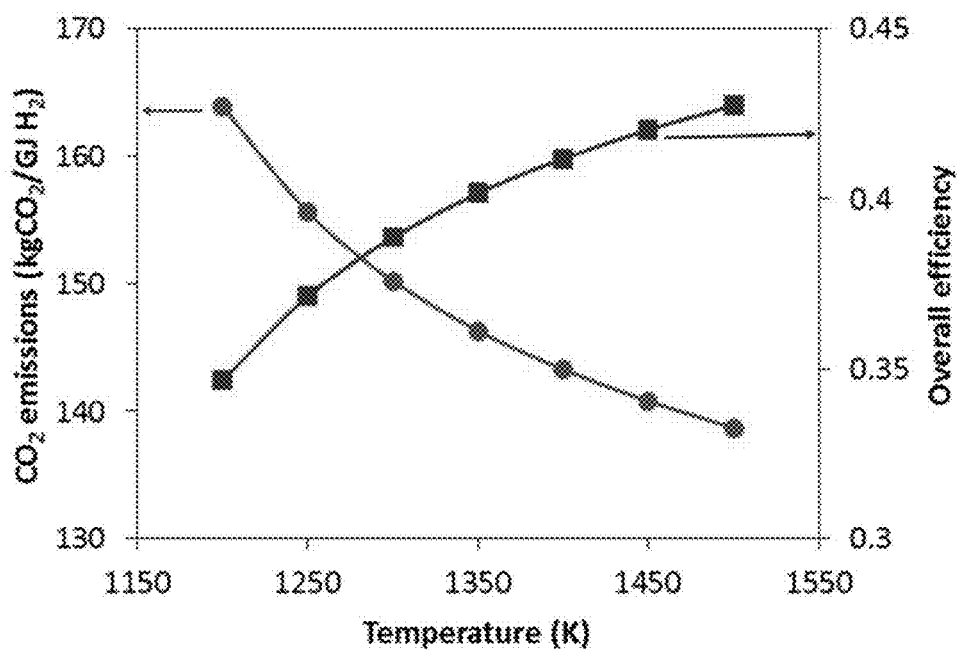
FIG. 10 represents a total $CO_2$ emission and an overall efficiency of the power generation system versus temperature of the exhaust stream that exits the combustor.

Finally, the amount of $CO_2$ produced in the plant at the preferred operating conditions is computed and presented hereunder the amount of $CO_2$ produced in the plant at the preferred operating conditions as listed in Table 1. FIG. 10 shows that increasing the CET decreases the amount of $CO_2$ emission per GJ of $H_2$ produced. The reduction in the $CO_2$ emission is due to the increase in the net power produced and efficiency of the plant. As reported earlier, the efficiency increases with increased CET. This indicates that system operating variables that will lead to increase system efficiency will also decrease the $CO_2$ emissions.

Example 2—Effect of BSCF ITM Membrane on System Performance

The power generation system was evaluated with the use of a BSCF membrane material ($Ba_{0.5}Sr_{0.5}Co_{0.8}Fe_{0.2}O_{3-\delta}$ membranes) that has passed the long hour stability test [Mezghani, K., et al., Effect of microstructure and thickness on oxygen permeation of $La_2NiO_{4+\delta}$ membranes, Ceramics International, 2016, 42(1)]. In FIG. 11, it was shown that the BSCF membrane material substantially improves the oxygen permeation and thus lowers the operating cost and system performance. For instance, the cost of hydrogen production reduces from $29.3/GJ $H_2$ to $15.68/GJ $H_2$ at CET=1200 K solely due to the effect of newly developed ITM material. This represents approximately 47% reduction in the cost of hydrogen production. The system overall efficiency similarly increases from 34.7% to 48.5% at CET=1200 K and from 42.7% to 52.8% at CET=1500 K, when the BSCF membrane material is deployed to the system. This implies that cost of hydrogen production can further be made cheaper with the BSCF membrane material. As stated earlier, one of the main advantages of this system is in the reduction of the carbon emission. The adoption of the BSCF membrane material further reduced the amount of $CO_2$ per unit of hydrogen produced. At CET of 1200 K, the amount of $CO_2$ emission decreases from about 163.9 $kgCO_2$/GJ $H_2$ to 113.5 $kgCO_2$/GJ $H_2$ as shown in FIG. 12. The use of the newly developed membrane in our system decreases the $CO_2$ emission by 28% (on average) under the studied operating conditions.

Figure 13:
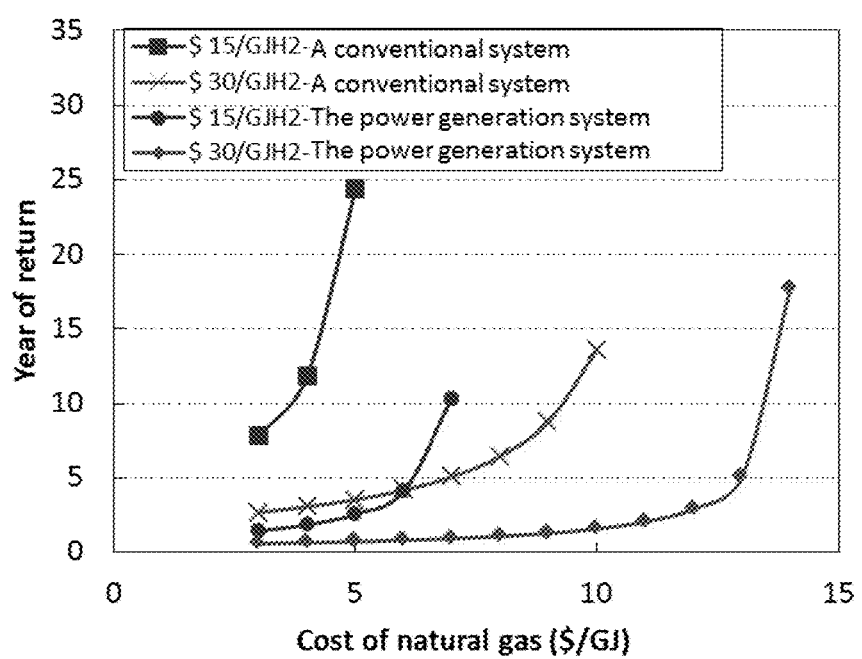
FIG. 13 represents a comparison of the number of years of investment return versus the cost of natural gas at various annualized cost of hydrogen produced, for the power generation system and a conventional system.

FIG. 13 shows that the BSCF membrane material with improve oxygen permeation lowers the year of return on investment. At hydrogen price of $15/GJ $H_2$, the YOR is nearly the same as the life span of the plant when the cost of natural gas is about $5/GJ of natural gas in conventional membrane. This implies that the plant is not profitable at that price (i.e. more than $5/GJ of natural gas and hydrogen price of $15/GJ $H_2$). the usage of the BSCF membrane material however improve the YOR to about 3 yrs (at $5/GJ of natural gas and hydrogen price of $15/GJ $H_2$) at the same operating condition. With the BSCF membrane material, the plant is profitable up to natural gas price of $7/GJ at hydrogen price of $15/GJ $H_2$. At higher hydrogen sales price (for example $30/GJ $H_2$), the proposed plant is profitable for cost of natural gas up to $14/GJ of natural gas for the BSCF membrane material. It is important to state that, the price of natural gas was at the peak in March 2008 at $13.042/GJ of natural gas and slide down to the minimum price in May 2016 at $0.795/GJ of natural gas. The cost of natural gas as at January 2017 is $3.745/GJ of natural gas [Direct energy historic natural gas rates, Regulated services, http://www.directenergyregulatedservices.com].

Example 3—Simulation Model

The thermodynamic model of the system presented was developed based on the conservation principle of mass, energy and second law of thermodynamics. In this study, the thermodynamics model is sub-divided into the energy and the exergy models. These models are treated sequentially. For simplicity, the following assumptions were made [Ahmadi, P. and I. Dincer, Thermodynamic and exergoenvironmental analyses and multi-objective optimization of a gas turbine power plant, Applied Thermal Engineering, 2011, 31(14); Barzegar Avval, H., et al., Thermo-economic-environmental multi objective optimization of a gas turbine power plant with preheater using evolutionary algorithm. International Journal of Energy Research, 2011, 35(5)]:
1. The fuel used in this study is considered to be pure methane.
2. All the gases are assumed to be ideal gases.
3. The isentropic efficiency of the compressors and turbines are assumed to be 0.83 and 0.87, respectively

[Barzegar Avval, H., et al., Thermo-economic-environmental multi objective optimization of a gas turbine power plant with preheater using evolutionary algorithm. International Journal of Energy Research, 2011, 35(5)].
4. All components are assumed to be adiabatic.
5. The dead state properties are taken as 101.25 kPa and 298 K.
6. The pressure drop in the combustor, reformer bed, mixer, condenser and HRSG are assumed to be 3% [Ahmadi, P. and I. Dincer, Thermodynamic and exergo environmental analyses and multi-objective optimization of a gas turbine power plant, Applied Thermal Engineering, 2011, 31(14)].
7. The combustion is assumed to be stoichiometric ($\theta$=1) and complete.
8. All processes are steady state.

In the energy model, the conservation of mass and energy equations given in Eq. (1) and (2) respectively is applied to the system component-wise.

Conservation of mass equation:

$$\Sigma_i \dot{m}_i = \Sigma_e \dot{m}_e \quad (1)$$

Conservation of energy equation for steady flow process is given as:

$$\dot{Q} - \dot{W} = \Sigma_e \dot{m}_e \cdot h_e - \Sigma_i \dot{m}_i \cdot h_i \quad (2)$$

Implementing the mass and energy equations on each component of the system as a control volume, a set of equations can be developed. These equations were solved using the engineering equation solver (EES) software to obtain the mass flow rate, temperature and enthalpy of each stream in the plant. The EES software has a data base of high accuracy thermodynamics and transport properties for hundreds of substances pre-installed in it [EES, Overview of Engineering Equation solver. http://www.fchart.com/ees]. Thus, all the thermodynamics properties required in solving our models are obtained from the EES data base. Some of the equations implemented for different components are given in Table 2 as obtained from [Ahmadi, P. and I. Dincer, Thermodynamic and exergo environmental analyses and multi-objective optimization of a gas turbine power plant, Applied Thermal Engineering, 2011, 31(14); Soltani, S., et al., Thermodynamic analyses of an externally fired gas turbine combined cycle integrated with a biomass gasification plant, Energy Conversion and Management, 2013, 70; Aljundi, I. H., Energy and exergy analysis of a steam power plant in Jordan, Applied Thermal Engineering, 2009. 29(2); Bejan, A. and G. Tsatsaronis, Thermal design and optimization 1996: John Wiley & Sons].

TABLE 2

Thermodynamics equations of some plant components [Ahmadi, P. and I. Dincer, Thermodynamic and exergoenvironmental analyses and multi-objective optimization of a gas turbine power plant, Applied Thermal Engineering, 2011, 31(14); Soltani, S., et al., Thermodynamic analyses of an externally fired gas turbine combined cycle integrated with a biomass gasification plant, Energy Conversion and Management, 2013, 70; Aljundi, I. H., Energy and exergy analysis of a steam power plant in Jordan, Applied Thermal Engineering, 2009. 29(2); Bejan, A. and G. Tsatsaronis, Thermal design and optimization 1996: John Wiley & Sons].

| Components | Equations |
|---|---|
| Compressor | $T_e = T_i \cdot \left\{ 1 + \frac{1}{\eta_c} \left[ r_c^{\left(\frac{\gamma_f - 1}{\gamma_f}\right)} - 1 \right] \right\}$ <br><br> $\dot{W}_c = \dot{m}_{cg} C_{pcg}(T_e - T_i)$ <br><br> The gas specific heat ratio of the compressor working fluid $\left( \gamma_f = \frac{c_p}{c_v} \right)$ is computed at mean temperature given as: <br><br> $T_{cm} = \frac{T_e + T_i}{2}$ |
| Gas turbine | $T_e = T_i \cdot \left\{ 1 - \eta_t \left[ 1 - r_t^{\left(\frac{1-\gamma_g}{\gamma_g}\right)} \right] \right\}$ <br><br> $\dot{W}_t = \dot{m}_{tg} C_{ptg}(T_e - T_i)$ <br><br> The gas specific heat ratio of the turbine working fluid $\left( \gamma_g = \frac{c_p}{c_v} \right)$ is similarly computed at mean temperature: <br><br> $T_{tm} = \frac{T_e + T_i}{2}$ |
| Pump | $|\dot{W}_p| = \frac{\dot{m}_w}{\eta_p} \cdot (h_e - h_i)$ <br><br> The pump efficiency ($\eta_p$) is 0.95 [Aljundi, I. H., Energy and exergy analysis of a steam power plant in Jordan, Applied Thermal Engineering, 2009. 29(2)]. |

TABLE 2-continued

Thermodynamics equations of some plant components [Ahmadi, P. and I. Dincer, Thermodynamic and exergoenvironmental analyses and multi-objective optimization of a gas turbine power plant, Applied Thermal Engineering, 2011, 31(14); Soltani, S., et al., Thermodynamic analyses of an externally fired gas turbine combined cycle integrated with a biomass gasification plant, Energy Conversion and Management, 2013, 70; Aljundi, I. H., Energy and exergy analysis of a steam power plant in Jordan, Applied Thermal Engineering, 2009. 29(2); Bejan, A. and G. Tsatsaronis, Thermal design and optimization 1996: John Wiley & Sons].

| Components | Equations |
|---|---|
| Combustor | The steady state steady flow energy equation for the combustor is: $$\sum_i H_{cc} + \eta_{cc} \cdot \left( \sum_{fc} \dot{m}_{fc} \cdot LHV_{fc} \right) = \sum_e H_{cc}$$ The dissociation of the product species in the combustor is neglected. The mass of oxygen required to be supplied by the ITM is computed as: $$\dot{m}_{O_2} = \left( \frac{64}{16} \cdot \dot{m}_{CH_4} + \frac{16}{28} \cdot \dot{m}_{CO} + \frac{16}{2} \cdot \dot{m}_{H_2} \right) \cdot (1 + \lambda)$$ $$\phi = \frac{1}{(1+\lambda)}$$ |
| Heat recovery system generator (HRSG) | $\sum_i \dot{m}_{H_2O} \cdot (h_{se} - h_{wi}) = \dot{m}_g \cdot (h_{gi} - h_{ge})$ |
| Condenser | $\dot{m}_{H_2O} \cdot (h_{we} - h_{wi}) = \left( \sum_i \dot{m}_g \cdot h_g - \sum_e \dot{m}_g \cdot h_g - \dot{m}_{condH_2O} \cdot h_{condH_2O} \right)$ |
| Gas mixer | $\sum_i \dot{m}_g \cdot h_g = \sum_e \dot{m}_g \cdot h_g$ |

Note:
in each component, the pressure drop is computed as: $P_e = P_i \cdot (1 - PD_c)$

Example 4—Air Separation Unit (ASU)

The air separation unit (ASU) is used to produce high purity oxygen stream from air thereby exiting two streams of pure oxygen and oxygen depleted air (spent air). The ASU adopted in this model is based on the principle of ion transport membrane (ITM). In such membranes, oxygen ion is conducted (Permeated) from zone with high oxygen partial pressure (High $P_{O2}$) to a zone with low oxygen partial pressure (low $P_{O2}$) at elevated temperature. In this study, the perovskite oxide $La_{0.6}Sr_{0.4}Co_{0.2}F_{0.8}O_{3-\delta}$ (LSCF) membrane is selected due to its high oxygen permeability and good chemical stability [Ryi, S.-K., et al., Combined steam and $CO_2$ reforming of methane using catalytic nickel membrane for gas to liquid (GTL) process, Catalysis Today, 2014, 236].

Xu and Thomson [Xu, J. and G. F. Froment, Methane steam reforming, methanation and water-gas shift: I. Intrinsic kinetics, AIChE Journal, 1989, 35(1)] proposed an expression for a steady state oxygen permeation flux in term of the oxygen partial pressure in the feed zone (oxygen rich zone) and permeate zone (oxygen deficient zone) as:

$$J_{O_2} = \frac{D_v \cdot K_r \cdot (P_{air}^{0.5} - P_s^{0.5})}{2 \cdot L_{mem} \cdot K_f \cdot P_{air}^{0.5} \cdot P_s^{0.5} + D_v \cdot (P_{air}^{0.5} + P_s^{0.5})} \quad (3)$$

The diffusion coefficient of oxygen vacancies ($D_V$), forward surface exchange rate constant ($K_f$) and reverse surface exchange rate constant ($K_r$) are obtained from [Hong, J., P. Kirchen, and A. F. Ghoniem, Numerical simulation of ion transport membrane reactors: oxygen permeation and transport and fuel conversion, Journal of Membrane Science, 2012, 407].

$$D_v = 1.01 \cdot 10^{-6} \cdot \exp\left( -\frac{75600}{8.314 \cdot T} \right) \quad (4)$$

$$K_f = 9.21 \cdot 10^4 \cdot \exp\left( -\frac{268000}{8.314 \cdot T} \right) \quad (5)$$

$$K_r = 1.75 \cdot 10^{15} \cdot \exp\left( -\frac{377000}{8.314 \cdot T} \right) \quad (6)$$

The mass flow rate of oxygen permeated across the membrane is computed as:

$$\dot{m}_{O_2} = J_{O_2} \cdot M_{wO_2} \cdot A_{memO_2} \quad (7)$$

The airside pressure ($P_{air}$) is maintained at 20 bar throughout this study, such that increased system pressure ($P_s$) will reduce the pressure difference across the oxygen membrane.

Example 5—Membrane Reformer

Steam methane reforming reaction (Eq. (8)) and water gas shift (Eq. (9)) reactions are described according to the following equations:

$$CH_4+H_2O \leftrightarrow CO+3H_2 \quad \Delta H_{R1,298K}^\circ = 206 \text{ KJ/mol} \quad (8)$$

$$CO+H_2O \leftrightarrow CO_2+H_2 \quad \Delta H_{R2,298K}^\circ = -41.1 \text{ KJ/mol} \quad (9)$$

The reforming reaction (Eq. (8)) is highly endothermic, the reaction is thus, favored by high temperatures. On the other hand, the water gas shift reaction (Eq. (9)) is mildly exothermic and favors low temperatures and high steam to carbon ratio (S/C). Previous studies have shown that methane conversion increases with increasing steam to methane ratio [Hoang, D., S. Chan, and O. Ding, Kinetic and modelling study of methane steam reforming over sulfide nickel catalyst on a gamma alumina support, Chemical Engineering Journal, 2005, 112(1)]. Substantial amount of heat is, however, required for high pressure steam generation [Antzara, A., et al., Thermodynamic analysis of hydrogen production via chemical looping steam methane reforming coupled with in situ $CO_2$ capture, International Journal of Greenhouse Gas Control, 2015, 32]. Intermediate SiC ratio of 3 is generally used in industrial application [Antzara, A., et al., Thermodynamic analysis of hydrogen production via chemical looping steam methane reforming coupled with in situ $CO_2$ capture, International Journal of Greenhouse Gas Control, 2015, 32; Bartholomew, C. H. and R. J. Farrauto, Fundamentals of industrial catalytic processes, 2011, John Wiley & Sons.], and is adopted in this study. The thermodynamic equilibrium calculations of Eq. (8) and Eq. (9) were used to estimate the syngas composition in the reformer. The equilibrium constants for these reactions are obtained from [Wang, Y., et al., Performance and effective kinetic models of methane steam reforming over Ni/YSZ anode of planar SOFC, International Journal of Hydrogen Energy, 2009, 34(9)] as follows:

$$K_1 = 1.198 \cdot 10^{17} \exp\left(-\frac{26830}{T}\right) \quad (10)$$

$$K_2 = 1.767 \cdot 10^{-2} \exp\left(\frac{4400}{T}\right) \quad (11)$$

The energy consumed during the reforming process is computed as:

$$Q_{ref} = \Delta H_{R1,298K}^\circ \cdot X_{CH4} - \Delta H_{R2,298K}^\circ \cdot X_{CO2} \quad (12)$$

The hydrogen permeation is modeled by equations presented in [De Falco, M., L. Di Paola, and L. Marrelli, Heat transfer and hydrogen permeability in modelling industrial membrane reactors for methane steam reforming, International Journal of Hydrogen Energy, 2007, 32(14)].

$$J_{H_2} = K_{H_2} \cdot \left(\frac{P_r^{0.5} - P_p^{0.5}}{t_{mem}}\right) \quad (13)$$

$$K_{H_2} = 8.686 \cdot 10^{-6} \cdot \exp\left(-\frac{10300}{8.314 \cdot T}\right) \quad (14)$$

The mass of hydrogen produced is computed as:

$$\dot{m}_{H_2} = J_{H_2} \cdot M_{WH_2} \cdot A_{memH_2} \quad (15)$$

Plant Energy Performance

Plant overall energetic efficiency is calculated as:

$$\eta_{plant} = \frac{\dot{W}_{net} + \dot{m}_{H_2} \cdot LHV_{H_2}}{\dot{m}_{CH_4} \cdot LHV_{CH_4}} \quad (16)$$

-continued $$\dot{W}_{net} = \Sigma_t \dot{W}_t - \Sigma_c \dot{W}_c - \Sigma_p \dot{W}_p \quad (17)$$

The efficiency of hydrogen production and $CO_2$ emission due to hydrogen production are estimated from:

$$\eta_{H2} = \frac{\dot{m}_{H_2} \cdot LHV_{H_2}}{\dot{m}_{CH_4} \cdot LHV_{CH_4} - \frac{\dot{W}_{net}}{\eta_{cg}}} \quad (18)$$

$$E_{CO2} = \frac{\dot{m}_{CO_2} - \dot{W}_{net} \cdot E_{el}}{\dot{m}_{H_2} \cdot LHV_{H_2}} \quad (19)$$

Exergy Model

The exergy of a system generally comprised of the physical exergy, chemical exergy, potential and kinetic energy. In the present study, the kinetic and potential exergies are neglected [Ahmadi, P., I. Dincer, and M. A. Rosen, Exergy, exergoeconomic and environmental analyses and evolutionary algorithm based multi-objective optimization of combined cycle power plants, Energy, 2011, 36(10)]. The exergy balance based on first and second law of thermodynamics can be written as:

$$\underbrace{EX_Q}_{\substack{\text{Exergy} \\ \text{associated with} \\ \text{heat transfer}}} + \sum_i \dot{m}_i \cdot ex_i = \sum_e \dot{m}_e \cdot ex_e + \underbrace{EX_W}_{\substack{\text{Work} \\ \text{input/output}}} + \underbrace{EX_D}_{\substack{\text{Exergy} \\ \text{destroyed in} \\ \text{the system}}} \quad (20)$$

The exergy flow into/out of the system is expressed as:

$$ex = ex^{ph} + ex^{ch} \quad (21)$$

Physical exergy ($ex^{ph}$) is the maximum theoretical useful work obtainable when the system interacts with the reference environment. The Physical exergy is given as [Bejan, A. and G. Tsatsaronis, Thermal design and optimization, 1996, John Wiley & Sons]:

$$ex^{phy} = h - h_0 - T_0 \cdot (s - s_0) \quad (22)$$

Chemical exergy ($ex^{ch}$) is the maximum work obtainable when the system is brought into reaction (chemical equilibrium) with reference substances present in the environment. The chemical exergy is given as [Bejan, A. and G. Tsatsaronis, Thermal design and optimization, 1996, John Wiley & Sons]:

$$ex^{ch} = ex_{mix}^{ch} + ex_{fuel}^{ch} \quad (23)$$

where the chemical exergy for gas mixture and fuel exergy are presented in Eq. (24) and (25), respectively [Bejan, A. and G. Tsatsaronis, Thermal design and optimization, 1996, John Wiley & Sons].

$$ex_{mix}^{ch} = \Sigma_j X_j \cdot ex_j^{ch} + \Sigma_j X_j \cdot \ln X_j \quad (24)$$

$$ex_{fuel}^{che} = \Sigma_j LHV_j \aleph_f \quad (25)$$

The fuel factor $\aleph_f$ is taken as 1.06 for methane and 0.985 for $H_2$ and 0.973 for CO [Aljundi, I. H., Energy and exergy analysis of a steam power plant in Jordan, Applied Thermal Engineering, 2009, 29(2); Ahmadi, P., I. Dincer, and M. A. Rosen, Exergy, exergoeconomic and environmental analyses and evolutionary algorithm based multi-objective optimization of combined cycle power plants, Energy, 2011, 36(10); Kotas, T. J., The exergy method of thermal plant analysis, 2013, Elsevier]. The exergy equations (Eq. (20)-(25)) are applied to the system component-wise to compute exergy destruction in the plant and identify the location of maximum exergy destruction.

The percentage contribution of each component to the overall exergy destruction rate is:

$$\eta_{XD,i} = \left(\frac{\dot{EX}_{D,i}}{\Sigma_i \dot{EX}_{D,i}}\right) \times 100 \qquad (26)$$

Economic Model

The economic analysis is carried out based on the annualized cost of the system presented in [Ebrahimi, A., et al., Energetic, exergetic and economic assessment of oxygen production from two columns cryogenic air separation unit, Energy, 2015, 90]. This involved the computation of the annualized capital cost, maintenance cost and operation cost.

$$CC_T = 1.1 \cdot \Sigma_i CC_i \qquad (27)$$

$$CC_A = CC_T \cdot CRF \qquad (28)$$

The cash recovery factor (CRF) is [Ebrahimi, A., et al., Energetic, exergetic and economic assessment of oxygen production from two columns cryogenic air separation unit, Energy, 2015, 90]:

$$CRF = \frac{i \cdot (1 + i)^n}{(1 + i)^n - 1} \qquad (29)$$

$$i = j - \left(\frac{f}{1+f}\right) \qquad (30)$$

The capital cost ($CC_i$) for the compressor, gas turbine, pump, combustor and heat recovery steam generator are estimated from cost functions presented in Table 3.

TABLE 3

Cost function of some plant components

| Components | Cost functions | Reference |
|---|---|---|
| Compressor | $CC_{comp} = \dfrac{39.5 \cdot \dot{m}_g}{0.9 - \eta_c} \cdot \left(\dfrac{P_e}{P_i}\right) \cdot \left[\ln\left(\dfrac{P_e}{P_i}\right)\right]$ | [Ebrahimi, A., et al., Energetic, exergetic and economic assessment of oxygen production from two columns cryogenic air separation unit, Energy, 2015, 90] |
| Gas turbine | $CC_{turb} = \dot{W}_t \cdot [-98.328 \cdot LN(\dot{W}_t) + 1318.5]$ | [Bejan, A. and G. Tsatsaronis, Thermal design and optimization, 1996, John Wiley & Sons] |
| Pump | $CC_{pump} = 442 \cdot \dot{W}_p^{0.71} \cdot F_n$ $F_n = 1.41 \cdot \left(1 + \dfrac{0.2}{1 - \eta_p}\right)$ | [Ebrahimi, A., et al., Energetic, exergetic and economic assessment of oxygen production from two columns cryogenic air separation unit, Energy, 2015, 90] |
| Combustor | $CC_{comb} = \theta_1 \cdot \dot{m}_{oxid}{}^{\theta_2} \cdot [1 + \exp(\theta_3 \cdot T_{e,comb} - \theta_4)]$ $\theta_1 = 11{,}816.2, \theta_2 = 1, \theta_3 = 0.0954, \theta_4 = 179.71$ | [Maréchal, F., et al., Thermo-Economic Modelling and Optimisation of Fuel Cell Systems, Fuel Cells, 2005, 5(1)] |
| Heat recovery system generator | $CC_{HRSG} = CC_{HX} + CC_{piping} + CC_{gas}$ $CC_{HX} = 3650 \cdot (f_p \cdot f_{T,steam} \cdot f_{p,gas} \cdot K^{0.8})$ $f_p = 0.0971 \cdot \left(\dfrac{P_i}{30}\right) + 0.9029$ $f_{T,steam} = 1 + \exp(T_{out,steam} - 2.075)$ $f_{T,gas} = 1 + \exp(T_{out,gas} - 1.98)$ $K = \dfrac{\dot{Q}}{LMTD}$ $CC_{piping} = 11820 \cdot (f_p \cdot \dot{m}_{steam})$ $CC_{gas} = 658 \cdot \dot{m}_{gas}{}^{1.2}$ | [Arsalis, A., Thermoeconomic modeling and parametric study of hybrid SOFC-gas turbine-steam turbine power plants ranging from 1.5 to 10 MWe, Journal of Power Sources, 2008, 181(2)] |

The total capital cost ($CC_T$) and the annualized capital cost ($CC_A$) are obtained from [Ebrahimi, A., et al., Energetic, exergetic and economic assessment of oxygen production from two columns cryogenic air separation unit, Energy, 2015, 90] as:

The capital cost of the membrane reformer is estimated using a relation that scale from a reference case [Maréchal, F., et al., Thermo-Economic Modelling and Optimisation of Fuel Cell Systems, Fuel Cells, 2005, 5(1)]. The cost is the addition of the reactor volume, catalyst and $H_2$ membrane cost. The breakdown of the cost is summarized in Table 4. The capital cost of the ITM was similarly estimated based on the procedure described in the reactor volume calculations in Table 4.

N is the number of operation hour in a year and is assumed to be 8,000 hours.

The annualized total cost of running the plant is:

$$TC_A = CC_A + MC_A + OC_A \quad (33)$$

TABLE 4

Cost of membrane reactor.

| | |
|---|---|
| The cost of the reactor volume | $CC_{reactor} = F_p \cdot CC_{ref,reactor} \cdot \left(\frac{Vol_{bed}}{Vol_{ref,bed}}\right)^\epsilon$ |
| the reference cost ($C_{ref,reactor}$) | 0.0167 m³ reactor = $21,936 [Maréchal, F., et al., Thermo-Economic Modelling and Optimisation of Fuel Cell Systems, Fuel Cells, 2005, 5(1)] |
| $F_p$ is the proportionality constant that accounts for changes in the rector pressure and materials | $F_p = B_1 + B_2 \cdot F_m \cdot F_n$ [Maréchal, F., et al., Thermo-Economic Modelling and Optimisation of Fuel Cell Systems, Fuel Cells, 2005, 5(1)] $B_1 = 1.62$ $B_2 = 1.47$ |
| $F_m$ is the material factor | 1 |
| $F_n$ is the pressure factor | $F_n = a_1 + a_2 \cdot (\log P) + a_3 \cdot (\log P)^2 + a_4 \cdot (\log P)^6 + a_5 \cdot (\log P)^8$ [Maréchal, F., et al., Thermo-Economic Modelling and Optimisation of Fuel Cell Systems, Fuel Cells, 2005, 5(1)] $a_1 = 0.5146$, $a_2 = 0.6838$, $a_3 = 0.297$, $a_4 = 0.0235$, $a_5 = 0.002$ |
| The volume of the reactor bed | $Vol_{bed} = \dfrac{Vol_{cat}}{1 - void}$ |
| The volume of the catalyst required | $Vol_{cat} = \dfrac{\alpha_{cat} \cdot \dot{m}_{CH_4}}{\rho_{cat}}$ Assuming a residence time ($\alpha_{cat}$) of $3.59 \dfrac{kg_{cag} \cdot s}{molCH_4}$ [Hoang, D., S. Chan, and O. Ding, Kinetic and modelling study of methane steam reforming over sulfide nickel catalyst on a gamma alumina support, Chemical Engineering Journal, 2005, 112(1)] |
| The catalyst cost | $CC_{cat} = Vol_{cat} \cdot CR_{cat}$ $CR_{cat}$ for Nickel alumina is $100,000/m³ [Maréchal, F., et al., Thermo-Economic Modelling and Optimisation of Fuel Cell Systems, Fuel Cells, 2005, 5(1)] |
| Cost of $H_2$ membrane | $CC_{Hmem} = F_p \cdot C_{mem} \cdot A_{memH_2}$ $C_{mem}$ is obtained based on a procedure presented in [Said, S.A., et al., Solar molten salt heated membrane reformer for natural gas upgrading and hydrogen generation: A CFD model, Solar Energy, 2016, 124] as $3570/m² |
| cost of the membrane reactor | $CC_{MR} = CC_{reactor} + CC_{cat} + CC_{Hmem}$ |

The system maintenance cost is assumed to be 6% of the capital cost [Ahmadi, P., I. Dincer, and M. A. Rosen, Exergy, exergoeconomic and environmental analyses and evolutionary algorithm based multi-objective optimization of combined cycle power plants, Energy, 2011, 36(10); Arsalis, A., Thermoeconomic modeling and parametric study of hybrid SOFC-gas turbine-steam turbine power plants ranging from 1.5 to 10 MWe, Journal of Power Sources, 2008, 181(2)], thus, the annualized maintenance cost is:

$$MC_A = \varphi \cdot CC_A \quad (31)$$

The annualized operating cost ($OC_A$) is:

$$OC_A = \text{Unit fuel cost} \cdot \dot{m}_{CH_4} \cdot N \quad (32)$$

The annualized cost of $H_2$ production (ACH) is:

$$ACH = \left(\frac{TC_A - CE_{prod}}{VOH.LHV_{H_2}}\right) \quad (34)$$

Where the total cost of electricity produced is:

$$CE_{prod} = EE_{produced} \cdot UCE \quad (35)$$

Where the unit cost of electricity (UCE) for a given natural gas price in a co-generation plant is computed based on the relation provided in [Zohrabian, A., et al., Techno-economic evaluation of an integrated hydrogen and power co-generation system with $CO_2$ capture, International Journal of Greenhouse Gas Control, 2016, 44].

The annual volume of $H_2$ produced is:

$$VOH = \dot{m}_{H2,produced} \cdot N \cdot 3600 \qquad (36)$$

The year of return (YOR) on investment is computed from:

$$YOR = \frac{TCC}{VOH \cdot CC_{H_2} + ACE_{prod} - AOC} \qquad (37)$$

The invention claimed is:

1. A power generation system, comprising:
   a membrane reformer assembly comprising
      a first vessel with a first internal cavity having a heating zone with a heating zone inlet and a heating zone outlet, a reaction zone with a reaction zone inlet and a reaction zone outlet, and a sweep zone with a sweep zone inlet and a sweep zone outlet, wherein the reaction zone and the sweep zone are separated by a hydrogen-permeable membrane;
   a combustor comprising
      a plurality of combustor feed inlets, and
      an exhaust outlet,
      wherein the combustor is located downstream of the membrane reformer assembly and at least one of said combustor feed inlets is fluidly connected to the reaction zone outlet via a syngas line; and
   an expander located downstream of the combustor and fluidly connected to the exhaust outlet via an exhaust line,
   wherein a natural gas/$H_2O$ stream is converted into a syngas stream in the reaction zone in the presence of a catalyst, and at least a portion of molecular hydrogen present in the syngas stream is transported across the hydrogen-permeable membrane to the sweep zone leaving behind a hydrogen-depleted syngas stream in the reaction zone,
   wherein the hydrogen-depleted syngas stream is combusted in the combustor to form an exhaust stream, and
   wherein the exhaust stream is expanded in the expander to generate power,
   the power generation system further comprising:
   an ion transport membrane assembly comprising
   a second vessel with a second internal cavity, and
   an ion transport membrane that divides the second internal cavity into a feed zone and a permeate zone, wherein the feed zone has an ITM feed inlet and an ITM feed outlet and the permeate zone has a permeate zone inlet and a permeate zone outlet,
   wherein at least a portion of molecular oxygen present in an oxygen-containing stream that is delivered to the feed zone is transported across the ion transport membrane to the permeate zone,
   wherein the ion transport membrane assembly is located downstream of the membrane reformer assembly and the permeate zone inlet is fluidly connected to the heating zone outlet via a sweep gas line, and
   wherein the ion transport membrane assembly is located upstream of the combustor and the permeate zone outlet is fluidly connected to one of said combustor feed inlets via an oxygen line.

2. The power generation system of claim 1, wherein the hydrogen-permeable membrane has a thickness in the range of 1 μm to 10 mm.

3. The power generation system of claim 1, further comprising:

a heat recovery steam generator located downstream of and fluidly connected to the expander via a second exhaust line, wherein the heat recovery steam generator generates steam by heat exchanging between a second water stream and the exhaust stream.

4. The power generation system of claim 1, further comprising:
   an exhaust recycle line that fluidly connects the exhaust line to the heating zone inlet of the membrane reformer assembly.

5. The power generation system of claim 3, further comprising:
   a high-pressure steam line fluidly connected to the heat recovery steam generator;
   a gas mixer fluidly connected to a natural gas line and the high-pressure steam line, wherein the gas mixer mixes a natural gas stream with steam to form the natural gas/$H_2O$ stream; and
   a reformer fuel line that fluidly connects the gas mixer to the reaction zone inlet of the membrane reformer assembly, wherein the reformer fuel line delivers the natural gas/$H_2O$ stream to the reaction zone.

6. The power generation system of claim 5, wherein the gas mixer operates in a pressure range of 2 to 20 bars, and the system further comprises
   a first compressor fluidly connected to the natural gas line, wherein the first compressor pressurizes the natural gas stream to a pressure range of 2 to 20 bars.

7. The power generation system of claim 5, further comprising:
   a second high-pressure steam line that fluidly connects the high-pressure steam line to the sweep zone inlet of the membrane reformer assembly, wherein the second high-pressure steam line delivers steam to the sweep zone to sweep the molecular hydrogen and to form a $H_2/H_2O$ stream; and
   a first condenser located downstream of the membrane reformer assembly and fluidly connected to the sweep zone outlet via a hydrogen line, wherein the first condenser condenses the $H_2/H_2O$ stream to form a hydrogen stream and a first purified water stream.

8. The power generation system of claim 1, further comprising:
   an ITM compressor located upstream of the ion transport membrane assembly and fluidly connected to the ITM feed inlet via an ITM feed line, wherein the ITM compressor pressurizes the oxygen-containing stream; and
   a turbine located downstream of the ion transport membrane assembly and fluidly connected to the ITM feed outlet via an oxygen-depleted line, wherein the turbine expands an oxygen-depleted stream that egresses the feed zone to generate power.

9. The power generation system of claim 8, wherein the ITM compressor is coupled to the turbine via a shaft.

10. The power generation system of claim 3, wherein the heat recovery steam generator is solar-powered.

11. The power generation system of claim 3, further comprising:
   a second condenser located downstream of and fluidly connected to the heat recovery steam generator via a third exhaust line, wherein the second condenser condenses the exhaust stream from the heat recovery steam generator to form a $CO_2$ stream and a second purified water stream.

12. The power generation system of claim 11, further comprising:

a $CO_2$ line fluidly connected to the second condenser;

a $CO_2$ recycle line that fluidly connects the $CO_2$ line to the oxygen line, wherein the $CO_2$ recycle line delivers at least a portion of the $CO_2$ stream to the oxygen line; and a second compressor fluidly connected to the $CO_2$ recycle line.

13. The power generation system of claim 11, further comprising:

a water treatment plant located downstream of and fluidly connected to the first condenser via a first purified water line and downstream of and fluidly connected to the second condenser via a second purified water line, wherein the water treatment plant produces distilled water.

14. A process for generating power with the system of claim 1, comprising:

mixing a natural gas stream with steam to form the natural gas/$H_2O$ stream and delivering the natural gas/$H_2O$ stream to the reaction zone of the membrane reformer assembly, wherein at least a portion of the natural gas/$H_2O$ stream is converted into the syngas stream in the presence of the catalyst, and wherein a portion of molecular hydrogen present in the syngas stream is transported across the hydrogen-permeable membrane to the sweep zone;

flowing steam to the sweep zone to sweep the molecular hydrogen and to form a $H_2$/$H_2O$ stream;

condensing the $H_2$/$H_2O$ stream to form a hydrogen stream and a first purified water stream; and combusting the hydrogen stream to generate power.

15. The process of claim 14, further comprising:

combusting the syngas stream and optionally a portion of the natural gas stream in the presence of an oxidant in the combustor to form the exhaust stream;

expanding the exhaust stream in the expander to generate power.

16. The process of claim 15, further comprising:

delivering at least a portion of the exhaust stream to the heating zone of the membrane reformer assembly to heat the reaction zone to a temperature in the range of 500 to 1,200° C.

17. The process of claim 15, wherein the oxidant comprises an oxygen-enriched stream and the process further comprises delivering the oxygen-containing stream to the feed zone of the ion transport membrane assembly, wherein a portion of molecular oxygen present in the oxygen-containing stream is transported across the ion transport membrane to the permeate zone;

flowing a portion of the exhaust stream to the permeate zone to sweep the molecular oxygen and to form the oxygen-enriched stream, which comprises oxygen, $CO_2$, and water vapor, and is substantially free from nitrogen; and delivering the oxygen-enriched stream to the combustor.

18. The process of claim 17, further comprising:

condensing the exhaust stream to form a $CO_2$ stream and a second purified water stream.

19. The process of claim 18, further comprising:

delivering the first and the second purified water streams to a water treatment plant to produce distilled water.

* * * * *